US012795514B2

(12) United States Patent
Heo et al.

(10) Patent No.: US 12,795,514 B2
(45) Date of Patent: Nov. 10, 2026

(54) VEHICLE ELECTRONIC APPARATUS AND OPERATING METHOD THEREOF

(71) Applicant: Samsung Electronics Co., Ltd., Suwon-si (KR)

(72) Inventors: Young Heo, Suwon-si (KR); Jaeweon Cho, Suwon-si (KR); Hyunjeong Kang, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 457 days.

(21) Appl. No.: 18/125,693

(22) Filed: Mar. 23, 2023

(65) Prior Publication Data

US 2023/0276348 A1 Aug. 31, 2023

Related U.S. Application Data

(63) Continuation of application No. PCT/KR2023/002674, filed on Feb. 24, 2023.

(30) Foreign Application Priority Data

Feb. 25, 2022 (KR) ........................ 10-2022-0025508
Apr. 4, 2022 (KR) ........................ 10-2022-0041906

(51) Int. Cl.
*H04W 48/10* (2009.01)
*H04W 28/02* (2009.01)
*H04W 72/30* (2023.01)

(52) U.S. Cl.
CPC ....... *H04W 48/10* (2013.01); *H04W 28/0215* (2013.01); *H04W 72/30* (2023.01)

(58) Field of Classification Search
CPC .. H04W 48/10; H04W 28/0215; H04W 72/30
See application file for complete search history.

(56) References Cited

U.S. PATENT DOCUMENTS 10,616,864 B2 * 4/2020 Sheng .................. H04W 72/02
10,805,832 B2 10/2020 Lee et al.
(Continued)

FOREIGN PATENT DOCUMENTS

EP 2848020 B1 * 3/2017 ............ H04W 36/14
KR 20210046189 A 4/2021
(Continued)

OTHER PUBLICATIONS

Vivo, "Support of NR Uu controlling LTE sidelink", R1-1906144, 3GPP TSG RAN1 WG1 Meeting #97, Reno, USA, May 1, 2019, pp. 1-6.

(Continued)

*Primary Examiner* — Parth Patel
(74) *Attorney, Agent, or Firm* — CANTOR COLBURN LLP

(57) ABSTRACT

Provided is a method of performing a vehicle-to-everything (V2X) communication and a vehicle electronic apparatus. The method includes controlling a first communication module configured for communication of a first communication type to receive, from at least one external device, a broadcast message indicating information about a communication type supported by the at least one external device, disabling the first communication module based on the broadcast message, and using a second communication module to perform communication with the at least one external device using a second communication type.

12 Claims, 20 Drawing Sheets

(56) References Cited

U.S. PATENT DOCUMENTS

| | | | | |
|---|---|---|---|---|
| 10,993,263 | B2 | 4/2021 | Lee et al. | |
| 11,457,431 | B2 * | 9/2022 | Tseng | H04W 76/14 |
| 2017/0186415 | A1 * | 6/2017 | An | G10K 11/178 |
| 2019/0230485 | A1 * | 7/2019 | Hahn | H04W 80/02 |
| 2019/0268725 | A1 * | 8/2019 | Edge | H04W 4/029 |
| 2019/0342944 | A1 * | 11/2019 | Chatterjee | H04W 80/08 |
| 2020/0022054 | A1 * | 1/2020 | Hong | H04B 17/391 |
| 2020/0029202 | A1 * | 1/2020 | Baghel | H04W 8/24 |
| 2020/0045674 | A1 * | 2/2020 | Tseng | H04W 76/14 |
| 2020/0229255 | A1 * | 7/2020 | Kang | H04W 36/0066 |
| 2020/0280828 | A1 | 9/2020 | Cheng et al. | |
| 2020/0314713 | A1 | 10/2020 | Jung et al. | |
| 2020/0367030 | A1 | 11/2020 | Baek et al. | |
| 2020/0404532 | A1 * | 12/2020 | Kang | H04W 76/14 |
| 2021/0076236 | A1 * | 3/2021 | Kimura | H04W 16/18 |
| 2021/0099976 | A1 * | 4/2021 | Mueck | H04W 72/04 |
| 2021/0120532 | A1 | 4/2021 | Li | |
| 2021/0160844 | A1 * | 5/2021 | Lin | H04W 72/20 |
| 2021/0297314 | A1 | 9/2021 | Stefanatos et al. | |
| 2021/0360725 | A1 * | 11/2021 | Tang | H04W 24/04 |
| 2021/0385865 | A1 * | 12/2021 | Mueck | H04W 74/0875 |
| 2022/0022190 | A1 * | 1/2022 | Lin | H04W 72/23 |
| 2022/0095368 | A1 * | 3/2022 | Yu | H04W 72/0446 |
| 2022/0104081 | A1 * | 3/2022 | Wang | H04W 48/18 |
| 2022/0110018 | A1 * | 4/2022 | Jha | H04W 74/0816 |
| 2022/0173840 | A1 * | 6/2022 | Wang | H04L 1/1896 |
| 2022/0240168 | A1 * | 7/2022 | Somayazulu | H04W 24/02 |
| 2022/0240170 | A1 | 7/2022 | Park et al. | |
| 2022/0312307 | A1 * | 9/2022 | Koshta | H04W 48/18 |
| 2022/0317312 | A1 * | 10/2022 | Sharma | H04W 4/40 |
| 2022/0346000 | A1 * | 10/2022 | Baek | H04W 48/16 |
| 2022/0355802 | A1 * | 11/2022 | Chaves | B60W 40/09 |
| 2023/0063472 | A1 * | 3/2023 | Freda | H04W 52/0229 |
| 2023/0141478 | A1 * | 5/2023 | Zhang | H04W 48/08 370/315 |
| 2023/0180131 | A1 * | 6/2023 | Kragten | H04W 52/0261 455/574 |
| 2023/0198673 | A1 * | 6/2023 | Hahn | H04W 72/25 370/329 |
| 2023/0276348 | A1 * | 8/2023 | Heo | H04W 48/10 370/329 |
| 2023/0379766 | A1 * | 11/2023 | Lee | H04W 4/06 |
| 2024/0049141 | A1 * | 2/2024 | Guo | H04W 52/36 |
| 2024/0057133 | A1 * | 2/2024 | Yoshioka | H04W 72/12 |
| 2024/0244489 | A1 * | 7/2024 | Guo | H04W 4/44 |
| 2024/0380819 | A1 * | 11/2024 | Zhang | H04L 67/12 |
| 2024/0397482 | A1 * | 11/2024 | Nagano | H04W 68/025 |

FOREIGN PATENT DOCUMENTS

| | | | | |
|---|---|---|---|---|
| KR | 102604255 | B1 | 11/2023 | |
| KR | 102742458 | B1 * | 12/2024 | B60W 30/18154 |
| WO | 2019117369 | A1 | 6/2019 | |
| WO | 2020088224 | A1 | 5/2020 | |

OTHER PUBLICATIONS

Lenovo et al., "Discussion on resource allocation for NR sidelink Mode 2", R1-2001969, 3GPP TSG RAN WG1, #100bis e-Meeting, Apr. 10, 2020, pp. 1-6.

Mario H. Castaneda Garcia et al., "A Tutorial on 5G NR V2X Communications", IEEE Communications Surveys & Tutorials, Feb. 3, 2021, pp. 1-55, vol. 23, Issue 3.

Mediatek Inc., "Coexistence mechanisms for NR-V2X and LTE-V2X", R1-1900202, 3GPP TSG RAN1 WG1 Meeting AH-1901, Taipei, Taiwan, Jan. 12, 2019, pp. 1-6.

Samsung, "Discussion on Coexistence between LTE and NR PC5", R1-1810875, 3GPP TSG RAN WG1 Meeting #94bis, Chengdu, China, Sep. 29, 2018, pp. 1-3.

International Search Report mailed May 31, 2023 for PCT/KR2023/002674.

* cited by examiner

VEHICLE ELECTRONIC APPARATUS AND OPERATING METHOD THEREOF

CROSS-REFERENCE TO RELATED APPLICATIONS

This application is a continuation of International Application No. PCT/KR2023/002674, designating the United States, filed on Feb. 24, 2023, in the Korean Intellectual Property Receiving Office and claiming priority to Korean Patent Application No. 10-2022-0025508, filed on Feb. 25, 2022 in the Korean Intellectual Property Office and Korean Patent Application No. 10-2022-0041906, filed on Apr. 4, 2022 in the Korean Intellectual Property Office, the disclosures of which are incorporated by reference herein in their entireties.

TECHNICAL FIELD

The disclosure relates to an electronic apparatus for disabling a first communication module, based on a broadcast message, and an operating method of the electronic apparatus.

BACKGROUND ART

In order to satisfy the increasing demand for wireless data traffic resulting from the commercialization of 4th generation (4G) communication systems, 5th generation (5G) mobile communication technology has been developed. The 5G mobile communication technology standard defines a wide frequency band to allow high transmission speeds and new service bandwidth. The 5G mobile communication technology standard may also be implemented in an ultra-high frequency ("above 6 GHz") band, commonly referred to as millimeter wave (mmWave), such as 28 GHz and 39 GHz, as well as a below 6 GHz frequency ("sub 6 GHz") band, such as 3.5 GHz.

In the early stage of 5G mobile communication technology standard development, in order to support services and satisfy the performance requirements for enhanced mobile broadband (eMBB), ultra-reliable low-latency communications (URLLC), and massive machine-type communications (mMTC), standardization has been enforced across a number of metrics, such as, for example, on beamforming and massive Multiple Input Multiple Output (MIMO) to mitigate the path loss of radio waves in the ultra-high frequency band and to increase the propagation distance of radio waves. Other standardizations include support of various numerologies (operation of multiple subcarrier intervals and the like) and dynamic operation of slot formats for efficient utilization of ultra-high frequency resources, initial access technology for supporting multi-beam transmission and broadband, definition and operation of bandwidth parts (BWPs), new channel coding methods such as low-density parity check (LDPC) codes for large-capacity data transmission and polar codes for reliable transmission of control information, L2 preprocessing, network slicing for providing dedicated networks specialized for particular services, and the like.

Solution to Problem

According to an embodiment of the disclosure, a vehicle electronic apparatus installed in a vehicle to perform vehicle-to-everything (V2X) communication may be provided. The vehicle electronic apparatus may include a first communication module configured to perform communication of a first communication type with at least one external device, a second communication module configured to perform communication of a second communication type, a memory storing one or more instructions, and a processor configured to execute the one or more instructions stored in the memory. The processor may be configured to control the first communication module to receive, from the at least one external device, a broadcast message indicating information about a communication type supported by the at least one external device. The processor may be configured to disable the first communication module and control the second communication module to perform communication with the at least one external device using the second communication type.

According to an embodiment of the disclosure, a method, performed by a vehicle electronic apparatus, of performing vehicle-to-everything (V2X) communication may be provided. The method may include controlling a first communication module performing communication of a first communication type to receive, from at least one external device, a broadcast message indicating information about a communication type supported by the at least one external device, disabling the first communication module based on the broadcast message, and controlling a second communication module to communicate with the at least one external device using the second communication type.

MODE OF DISCLOSURE

Figure 1:
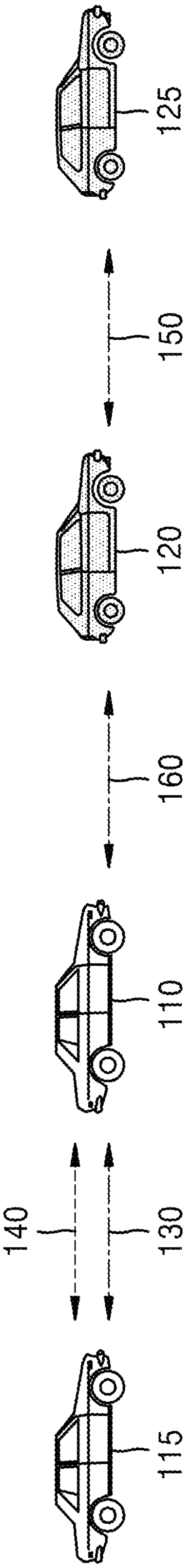
FIG. 1 is a diagram describing a terminal communication method based on vehicle-to-everything (V2X) technology.

Throughout the disclosure, the expression "at least one of a, b or c" indicates only a, only b, only c, both a and b, both a and c, both b and c, all of a, b, and c, or variations thereof.

Terms used herein will be briefly described and then embodiments of the disclosure will be described in detail.

The terms used herein are those general terms currently widely used in the art in consideration of functions in the disclosure, but the terms may vary according to the intentions of those of ordinary skill in the art, precedents, or new technology in the art. Also, in some cases, there may be terms that are optionally selected by the applicant, and the meanings thereof will be described in detail in the corresponding portions of the disclosure. Thus, the terms used herein should be understood not as simple names but based on the meanings of the terms and the overall description of the disclosure.

Throughout the disclosure, when something is referred to as "including" an element, one or more other elements may be further included unless specified otherwise. Also, as used herein, the terms such as "units" and "modules" may refer to units that perform at least one function or operation, and the units may be implemented as hardware or software or a combination of hardware and software.

Hereinafter, embodiments of the disclosure will be described in detail with reference to the accompanying drawings so that those of ordinary skill in the art may easily implement the embodiments of the disclosure. However, the disclosure may be embodied in many different forms and should not be construed as being limited to the embodiments set forth herein. Also, portions irrelevant to the description of the disclosure will be omitted in the drawings for a clear description of the disclosure, and like reference numerals will denote like elements throughout the specification.

FIG. 1 is a diagram describing a communication method of terminals based on V2X technology.

A vehicle communication service represented by a vehicle-to-everything (V2X) service may include a vehicle-to-vehicle (V2V) type, a vehicle-to-infrastructure (V2I) type, a vehicle-to-network (V2N) type, a vehicle-to-pedestrian (V2P) type, and the like. The V2X service may be provided by a PC5 interface and/or a Uu interface. The V2X service supported through the PC5 interface may be provided by V2X side-link communication (a communication mode in which terminals may directly communicate with each other through the PC5 interface), and may be supported when a terminal is served by a next-generation radio access network (NG-RAN) and is outside an RAN coverage. Only a terminal with V2X service usage rights may perform V2X side-link communication. Cellular-V2X (C-V2X) technology may be a type of standard technology for defining the V2X technology. The C-V2X technology may refer to cellular-based V2X technology such as Long Term Evolution (LTE) and 5th generation mobile communication (5G). The 3rd Generation Partnership Project (3GPP) may define technology related to the C-V2X technology. For example, the C-V2X technology may include both the Long Term Evolution (LTE)-based V2X technology (hereinafter referred to as LTE V2X technology) presented in the standards Release 14 and Release 15 and the 5G New Radio (NR)-based V2X technology (hereinafter referred to as NR V2X technology) presented in the standard Release 16. Also, the C-V2X technology is not limited to the V2X technologies defined in the above standards.

Currently, the LTE V2X technology defined in Release 14 and Release 15 is being commercialized. For example, based on the standard defining the LTE V2X technology, a terminal and a vehicle supporting the LTE V2X technology may be implemented and a roadside unit (RSU) may be installed in each area. When radio access technology (RAT) other than LTE is developed later, a situation will occur where a communication system based on the currently commercialized LTE V2X technology will coexist with a communication system based on another RAT technology. The NR V2X technology standardization is ongoing.

Also, even in a situation where the NR V2X technology is generalized, when a terminal in use does not need to utilize the features and capabilities offered by NR V2X technology, a user may select and use a terminal that supports only the LTE V2X technology. This may be because a terminal also supporting the NR V2X technology may be more expensive than a terminal supporting only the LTE V2X technology.

Thus, in order to avoid confusion and waste of resources, an efficient coexistence scheme may be required between the V2X technologies supporting different RATs. Also, by considering the NR V2X technology currently being developed, association between the LTE V2X technology and the NR V2X technology may be required.

Table 1 below may be a table describing communication types supported by the LTE V2X technology and the NR V2X technology.

TABLE 1

| LTE V2X | NR V2X |
|---|---|
| Broadcast | Broadcast, Unicast, Multicast |

A broadcast may refer to a communication type in which a terminal simultaneously transmits data or control information to a plurality of other unspecified terminals. That is, the broadcast may refer to a one-to-many communication type. A unicast may refer to a communication type in which a terminal transmits data or control information to another unspecified terminal. The unicast may refer to a one-to-one communication type. A multicast may refer to a communication type in which a terminal simultaneously transmits data or control information to a plurality of other specified terminals.

Referring to Table 1, the LTE V2X technology may support a terminal transmitting or receiving a message in a broadcast type. The NR-based V2X technology may support a terminal transmitting or receiving a message by using at least one of a broadcast type, a unicast type, or a multicast type.

A communication method of a first terminal 110 and a second terminal 115 supporting the NR V2X technology and a third terminal 120 and a fourth terminal 125 supporting the LTE V2X technology may be described with reference to FIG. 1.

The third terminal 120 and the fourth terminal 125 supporting the LTE V2X technology may transmit/receive an LTE V2X message 150 based on the LTE V2X technology. Also, the first terminal 110 and the second terminal 115 supporting the NR V2X technology may transmit/receive an LTE V2X message 130 based on the LTE V2X technology or an NR V2X message 140 based on the NR V2X technology. Also, the first terminal 110 supporting the NR V2X technology and the third terminal 120 supporting the LTE V2X technology may transmit/receive an LTE V2X message 160.

In a situation where there is no need to use the LTE-based V2X technology, the first terminal 110 and the second terminal 115 capable of using the NR-based V2X technology may not need to transmit/receive an LTE V2X message 130. This may be because the first terminal 110 and the second terminal 115 may transmit/receive an NR V2X message 140.

For smooth coexistence between the LTE V2X technology (4th generation mobile communication technology) and the NR V2X technology (5th generation mobile communication technology), this disclosure may be intended to provide a method by which radio resources may be efficiently utilized and a terminal may be efficiently operated.

The first terminal 110 and the second terminal 115 according to an embodiment of the disclosure may be set to disable the LTE-based V2X technology and use only the NR-based V2X technology. According to an embodiment of the disclosure described above, waste of radio resources used for transmission/reception and power wasted in the terminal may be reduced.

Figure 2A:
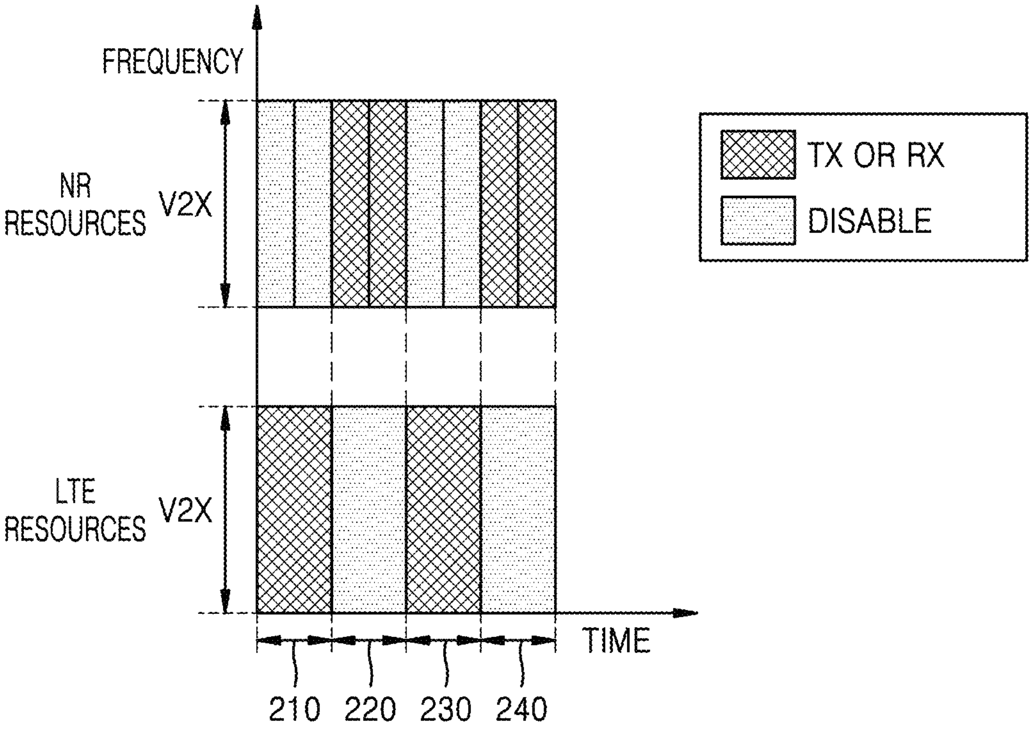
FIG. 2A is a diagram describing a method of allocating time resources in a situation where different radio access technologies (RATs) coexist.

FIG. 2A is a diagram describing a method of allocating time resources in a situation where different RATs coexist.

In some embodiments, in a situation where different radio access technologies (RATs), such as the LTE V2X technology and the NR V2X technology, should be simultaneously used, a time division multiplexing (TDM) method and a frequency division multiplexing (FDM) method are being considered. When the TDM method is used, two RATs may be separately used on the time axis. A situation where the LTE V2X technology and the NR V2X technology coexist based on the TDM method may be described with reference to FIGS. 2A and 2B.

Referring to FIG. 2A, the LTE V2X technology may be used during a first subframe 210 and a third subframe 230, and the NR V2X technology may be used during a second subframe 220 and a fourth subframe 240. The terminal supporting the LTE V2X technology may transmit or receive ("TX OR RX") an LTE-based signal during the first subframe 210 and the third subframe 230 by using LTE V2X resources. During the first subframe 210 and the third subframe 230, the terminal supporting the NR V2X technology may be disabled ("DISABLE") for NR V2X resources. The terminal supporting the NR V2X technology may transmit or receive an NR-based signal during the second subframe 220 and the fourth subframe 240 by using NR V2X resources. Observe that, for example, each subframe may include two slots for the NR V2X technology. During the second subframe 220 and the fourth subframe 240, the terminal supporting the LTE V2X technology may be disabled ("DISABLE") for LTE V2X resources.

Figure 2B:
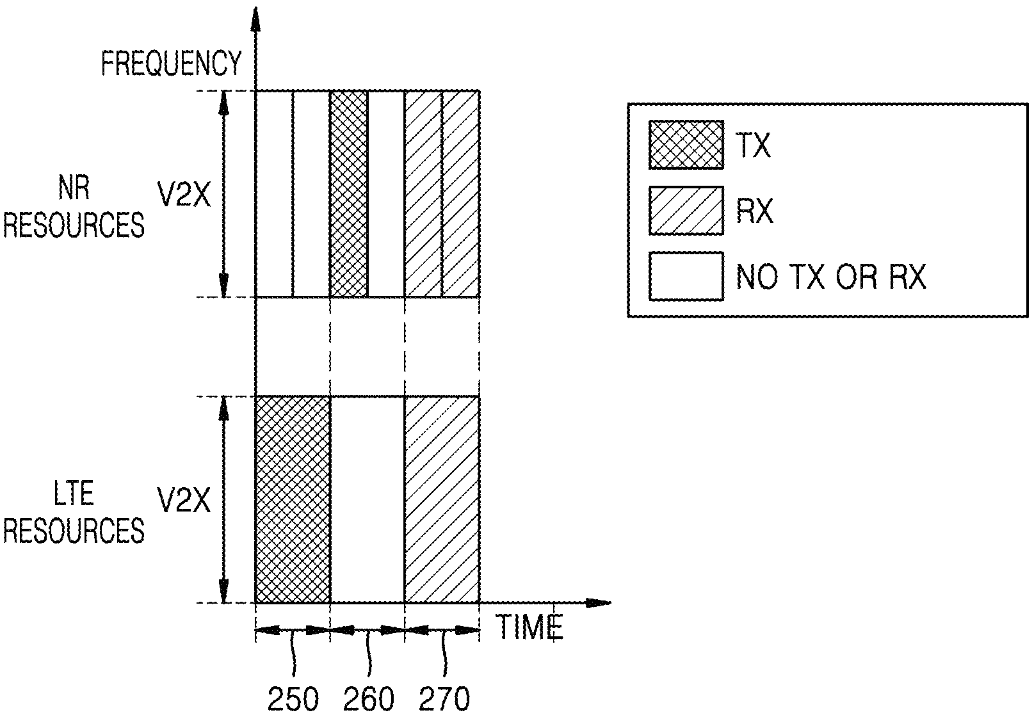
FIG. 2B is diagram describing a method of allocating time resources in a situation where RATs coexist.

FIG. 2B is a diagram describing a method of allocating time resources in a situation where different RATs coexist.

Referring to FIG. 2B, the LTE V2X technology may be used during a fifth subframe 250 and a seventh subframe 270, and the NR V2X technology may be used during some slots of a sixth subframe 260 and the seventh subframe 270. The terminal supporting the LTE V2X technology may transmit ("TX") an LTE-based signal during the fifth subframe 250 by using LTE V2X resources. During the fifth subframe 250, there may be no transmission or reception signal using NR V2X resources ("No TX or RX"). The terminal supporting the NR V2X technology may transmit an NR-based signal during at least one of two slots included in the sixth subframe 260. For example, the terminal may transmit an NR-based signal by using a first slot among the two slots included in the sixth subframe 260. The terminal supporting the LTE V2X technology may receive ("RX") an LTE-based signal during the seventh subframe 270 by using LTE V2X resources. The terminal supporting the NR V2X technology may receive an NR-based signal during the seventh subframe 270 by using NR V2X resources.

It may be inefficient for a terminal supporting both NR V2X technology and LTE V2X technology to use the LTE V2X technology when there are no other terminals supporting only the LTE V2X available, for example, in a situation where the LTE V2X technology and the NR V2X technology coexist based on the TDM method. That is, this method may be low in terms of radio resource usage efficiency and may be inefficient in terms of terminal power consumption. Thus, according to an embodiment of the disclosure, an efficient V2X service may be provided when the terminal may turn off the LTE V2X technology depending on situation.

The disclosure may be intended to provide a terminal capable of minimizing the use of the LTE V2X technology and maximizing the use of the NR V2X technology when a terminal supporting both LTE V2X technology and NR V2X technology is allocated resources in a TDM manner.

Figure 3:
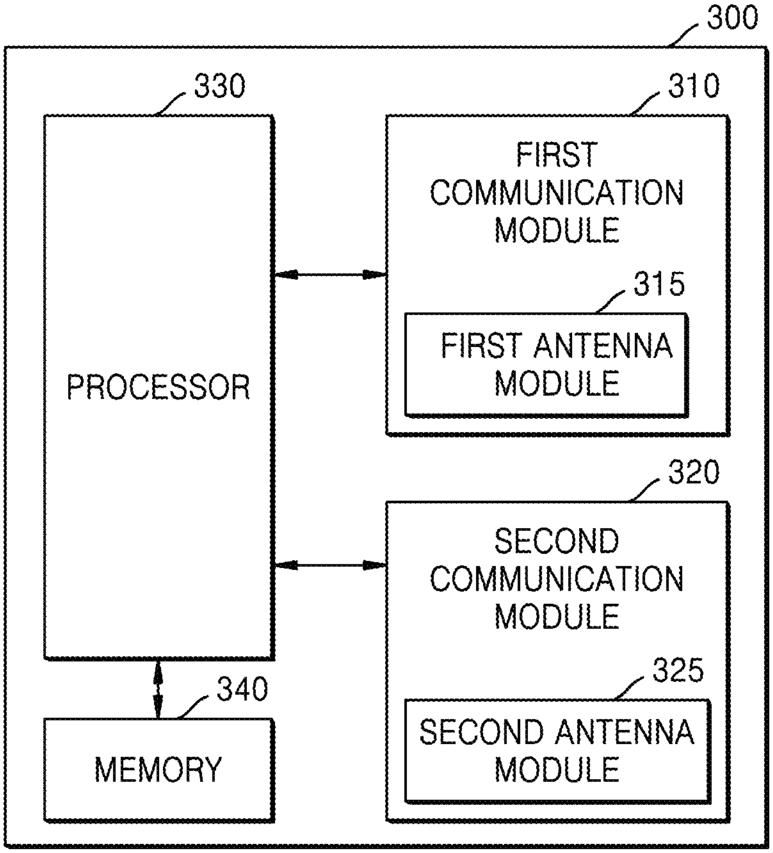
FIG. 3 is a block diagram illustrating a configuration of a vehicle electronic apparatus according to an embodiment of the disclosure.

FIG. 3 is a block diagram illustrating a configuration of a vehicle electronic apparatus according to an embodiment of the disclosure.

A vehicle electronic apparatus 300 may correspond to a first terminal 10, a second terminal 20, and a third terminal 30 described below.

Referring to FIG. 3, the vehicle electronic apparatus 300 may include a first communication module 310, a second communication module 320, a processor 330, and a memory 340.

The first communication module 310 according to an embodiment of the disclosure may include a mobile communication module and may transmit/receive data to/from a base station by a mobile communication method. The mobile communication method may include a 4G communication method or a 3G communication method. However, the disclosure is not limited thereto. The first communication module 310 may perform communication of a first communication type corresponding to V2X communication of a first radio access technology with at least one electronic apparatus included in the coverage of the vehicle electronic apparatus 300. For example, the V2X communication of the first radio access technology may include the LTE V2X technology.

The second communication module 320 according to an embodiment of the disclosure may include a mobile communication module and may transmit/receive data to/from a base station by a mobile communication method. The mobile communication method may include a mmWave band-based 5G communication method or a below 6 GHz band (sub-6 band)-based 5G communication method. However, the disclosure is not limited thereto. The second communication module 320 may perform communication of a second communication type corresponding to V2X communication of a second radio access technology with at least one electronic apparatus included in the coverage of the vehicle electronic apparatus 300. For example, the V2X communication of the second radio access technology may include the NR V2X technology.

Also, the first communication module 310 may include a first antenna module 315, and the second communication module 320 may include a second antenna module 325. Beams for the mobile communication methods may be generated in the first antenna module 315 and the second antenna module 325, and the first antenna module 315 and the second antenna module 325 may perform beamforming for adjusting the propagation directions, shapes, and/or the like of beams.

The processor 330 may control an overall operation of the vehicle electronic apparatus 300. The processor 330 may execute one or more programs stored in the memory 340. The memory 340 according to an embodiment of the disclosure may store various data, programs, or applications for driving and controlling the vehicle electronic apparatus 300. The processor 330 may include hardware components for performing arithmetic, logic, and input/output operations and signal processing. The processor 330 may include, for example, at least one of a central processing unit, a microprocessor, a graphic processor (graphic processing unit), application specific integrated circuits (ASICs), digital signal processors (DSPs), digital signal processing devices (DSPDs), programmable logic devices (PLDs), or field programmable gate arrays (FPGAs); however, the disclosure is not limited thereto.

The memory 340 may include, for example, a nonvolatile memory including at least one of a flash memory type, a hard disk type, a multimedia card micro type, a card type memory (e.g., SD or XD memory), a read-only memory (ROM), an electronically erasable programmable read-only memory (EEPROM), or a programmable read-only memory (PROM) and a volatile memory such as a random-access memory (RAM) or a static random-access memory (SRAM).

The memory 340 may store instructions, data structures, and program codes readable by the processor 330. In the following embodiments of the disclosure, the processor 330 may be implemented by executing the instructions or codes of the program stored in the memory.

The processor 330 according to an embodiment of the disclosure may control the first communication module 310 to receive, from at least one external device, a broadcast message indicating information about a communication type supported by the at least one external device. The processor 330 may disable the first communication module 310 based on the broadcast message. The processor 330 may control the second communication module 320 to perform communication with at least one external device. The processor 330 according to an embodiment of the disclosure may control the first communication module 310 to receive a request message including information for requesting a communication type supported by the vehicle electronic apparatus 300. Based on the request message, the processor 330 may control the first communication module 310 to transmit a response message including information related to the communication type supported by the vehicle electronic apparatus 300.

Based on the request message and the broadcast message, the processor 330 according to an embodiment of the disclosure may identify information about a communication type supported by at least one external device within a coverage including the vehicle electronic apparatus 300. The processor 330 may identify whether to enable or disable the first communication module, based on information about a communication type supported by at least one external device.

The processor 330 according to an embodiment of the disclosure may identify whether the information about the communication type supported by the at least one external device corresponds to the first communication type, based on the broadcast message and the request message including the information for requesting the communication type supported by the vehicle electronic apparatus 300.

Based on the broadcast message, the processor 330 according to an embodiment of the disclosure may identify the information about the communication type supported by the at least one external device. The processor 330 may identify whether to enable or disable the first communication module, based on the information about the communication type supported by the at least one external device.

The processor 330 according to an embodiment of the disclosure may disable the first communication module 310 when the information about the communication type supported by the at least one external device corresponds to the second communication type.

The processor 330 according to an embodiment of the disclosure may sense a broadcast message or a request message in a time interval allocated for the first communication type. The processor 330 may detect a broadcast message or a request message based on a threshold value. When a broadcast message or a request message is detected, the processor 330 may identify information for requesting a communication type or the information about the communication type supported by the at least one external device. The processor 330 according to an embodiment of the disclosure may identify the time interval allocated for the first communication type, based on the result of sensing the broadcast message or the request message.

The processor 330 according to an embodiment of the disclosure may control the first communication module 310 to receive, from the second terminal 20, a first broadcast message corresponding to the first communication type in the time interval allocated for the first communication type. Based on the first broadcast message, the processor 330 may identify whether to enable or disable a communication mode corresponding to the first communication type of the first terminal. Based on the identification result, the processor 330 may enable or disable the communication mode corresponding to the first communication type of the first terminal 10.

The processor 330 according to an embodiment of the disclosure may identify at least one communication type supported by the first terminal 10, based on information for requesting a communication type included in the first broadcast message.

Based on the first broadcast message, the processor 330 according to an embodiment of the disclosure may control the first communication module 310 to transmit a second broadcast message including information indicating the second communication type in response to the information for requesting the communication type. For example, the second broadcast message may be a message corresponding to the first communication type and may be broadcast to at least one other terminal within a coverage including the first terminal 10.

Based on the first broadcast message, the processor 330 according to an embodiment of the disclosure may control the first communication module 310 to receive at least one second broadcast message including information indicating a communication type of another terminal from at least one other terminal within the coverage including the first terminal 10. Based on the first broadcast message and at least one second broadcast message, the processor 330 may identify a communication type of at least one other terminal within the coverage including the first terminal 10. Based on the communication type of the at least one other terminal, the processor 330 may identify whether to enable or disable the communication mode corresponding to the first communication type of the first terminal 10.

Based on the first broadcast message and at least one second broadcast message, the processor 330 according to an embodiment of the disclosure may identify whether a communication type of at least one other terminal within the coverage including the first terminal 10 corresponds to the first communication type. When the communication type of all other terminals within the coverage including the first terminal 10 corresponds to the second communication type, the communication mode corresponding to the first communication type may be disabled, and when the communication type of at least one other terminal within the coverage including the first terminal 10 corresponds to the first communication type, the communication mode corresponding to the first communication type may be enabled.

Based on the first broadcast message, the processor 330 according to an embodiment of the disclosure may identify information indicating a communication type supported by the second terminal 20. Based on the information indicating the communication type supported by the second terminal 20, the processor 330 may identify whether to enable or disable the communication mode corresponding to the first communication type of the first terminal 10. The processor 330 may disable the communication mode corresponding to the first communication type of the first terminal 10 when the information indicating the communication type supported by the second terminal 20 corresponds to the second communication type.

The processor 330 according to an embodiment of the disclosure may sense a first broadcast message corresponding to the first communication type in a time interval allocated for the first communication type. The processor 330 may detect the first broadcast message based on a threshold value. When the first broadcast message is detected, the processor 330 may identify at least one of the information for requesting the communication type included in the first broadcast message or the information indicating the communication type supported by the second terminal 20.

The processor 330 according to an embodiment of the disclosure may identify the time interval allocated for the first communication type, based on the result of sensing the first broadcast message corresponding to the first communication type.

The processor 330 according to an embodiment of the disclosure may control the first communication module 310 to transmit, to at least one other terminal within a coverage including the second terminal 20, a first broadcast message corresponding to the first communication type in a time interval allocated for the first communication type. The processor 330 may receive a second broadcast message corresponding to the first communication type from at least one other terminal in a time interval. Based on at least one of the first broadcast message or the second broadcast message, the processor 330 may identify whether to enable or disable a communication mode corresponding to the first communication type of the second terminal 20. Based on the identification result, the processor 330 may be configured to enable or disable the communication mode corresponding to the first communication type of the second terminal 20.

Moreover, the block diagram of the vehicle electronic apparatus 300 illustrated in FIG. 3 may be a block diagram for an embodiment of the disclosure. Each component of the block diagram may be integrated, added, or omitted according to the specifications of the vehicle electronic apparatus 300 that are actually implemented. That is, when necessary, two or more components may be combined into one component, or one component may be divided into two or more components. Also, a function performed in each block is to describe embodiments of the disclosure, and a particular operation or device thereof is not intended to limit the scope of the disclosure.

In some embodiments, the first communication type may correspond to V2X of the first radio access technology. For example, the first communication type may correspond to LTE V2X.

In some embodiments, the second communication type may correspond to V2X of the second radio access technology. For example, the second communication type may correspond to NR V2X.

In some embodiments, the first terminal 10, the second terminal 20, and the third terminal 30 may correspond to the terminal supporting the first communication type and the second communication type.

In some embodiments, the first terminal 10, the second terminal 20, and the third terminal 30 may enable or disable the communication mode corresponding to the first communication type. That the communication mode corresponding to the first communication type is disabled may mean that the terminal supporting the first communication type and the second communication type performs communication based on the second communication type. For example, that the communication mode corresponding to the first communication type is disabled may mean that the terminal supporting the LTE V2X technology and the NR V2X technology performs communication based on the NR V2X technology. On the other hand, that the communication mode corresponding to the first communication type is enabled may mean that the terminal supporting the LTE V2X technology and the NR V2X technology performs communication based on the LTE V2X technology.

In some embodiments, that the communication mode corresponding to the first communication type is disabled may include that the communication mode corresponding to the first communication type in a disabled state is maintained at the disabled state. In some embodiments, that the communication mode corresponding to the first communication type is enabled may include that the communication mode corresponding to the first communication type in an enabled state is maintained at the enabled state.

In some embodiments, the terminal supporting LTE-based communication may support only the LTE V2X technology. Also, the terminal supporting NR-based communication may simultaneously support the NR V2X technology and the LTE V2X technology.

In some embodiments, the broadcast message may include a first broadcast message and a second broadcast message. The broadcast message may further include a basic safety message (BSM). The BSM may refer to a safety message that is periodically transmitted.

In some embodiments, transmitting or receiving the broadcast message may mean transmitting or receiving a message including data, signals, control information, or the like in a broadcast manner. Transmitting or receiving the broadcast message may mean transmitting or receiving a corresponding message to a plurality of unspecified terminals included in the coverage.

In some embodiments, the terminal may refer to a vehicle electronic apparatus, an electronic apparatus that may be installed in a vehicle, or a vehicle; however, the disclosure is not limited thereto.

In some embodiments, that the terminal supports the communication type may mean that the terminal may perform communication based on the V2X technology corresponding to the corresponding RAT. For example, that the terminal supports the first communication type may mean that the terminal may transmit or receive data, messages, control information, signals, or the like based on the LTE V2X technology and may sense whether an LTE signal exists in the frequency band and the time band allocated in the LTE V2X technology.

Figure 4A:
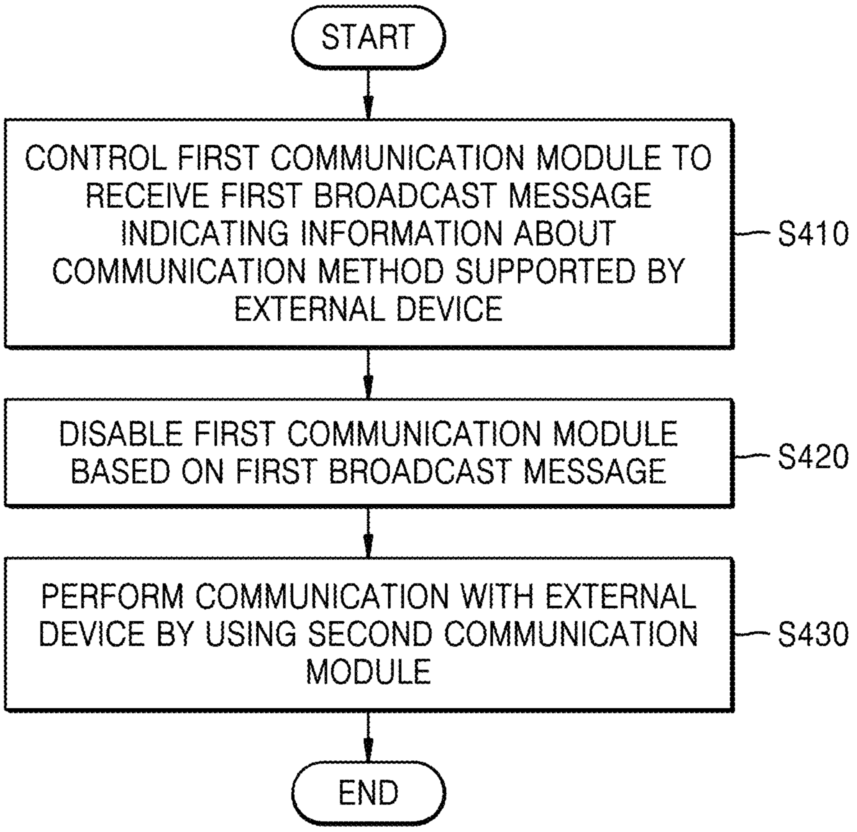
FIG. 4A is a flowchart of a method used by a vehicle electronic apparatus to perform V2X communication, according to an embodiment of the disclosure.

FIG. 4A is a flowchart of a method by which a vehicle electronic apparatus performs vehicle-to-everything (V2X) communication, according to an embodiment of the disclosure.

The vehicle electronic apparatus 300 according to an embodiment of the disclosure may correspond to the first terminal 10 described below.

In operation S410, the vehicle electronic apparatus 300 may control a first communication module to receive, from at least one external device, a broadcast message indicating information about a communication type supported by the at least one external device.

The vehicle electronic apparatus 300 according to an embodiment of the disclosure may control the first communication module to receive a request message including information for requesting a communication type supported by the vehicle electronic apparatus. Based on the request message, the vehicle electronic apparatus 300 may control the first communication module to transmit a response message including information related to the communication type supported by the vehicle electronic apparatus.

The broadcast message according to an embodiment of the disclosure may correspond to a response message of at least one external device in response to a request message. The request message according to an embodiment of the disclosure may be transmitted together with a basic safety message (BSM), and the request message may be transmitted based on a preset period.

The broadcast message according to an embodiment of the disclosure may be transmitted together with a basic safety message (BSM).

In operation S420, the vehicle electronic apparatus 300 may disable the first communication module based on the broadcast message.

Based on the request message and the broadcast message, the vehicle electronic apparatus 300 according to an embodiment of the disclosure may identify information about the communication type supported by the at least one external device within the coverage including the vehicle electronic apparatus. The vehicle electronic apparatus 300 may identify whether to enable or disable the first communication module, based on information about a communication type supported by at least one external device.

The vehicle electronic apparatus 300 according to an embodiment of the disclosure may identify whether the information about the communication type supported by the at least one external device corresponds to the first communication type, based on a broadcast message and a request message including information for requesting a communication type supported by the vehicle electronic apparatus 300.

Based on the broadcast message, the vehicle electronic apparatus 300 according to an embodiment of the disclosure may identify the information about the communication type supported by the at least one external device. The vehicle electronic apparatus 300 may identify whether to enable or disable the first communication module, based on the information about the communication type supported by at least one external device. The vehicle electronic apparatus 300 according to an embodiment of the disclosure may disable the first communication module when the information about the communication type supported by the at least one external device corresponds to the second communication type.

In operation S430, the vehicle electronic apparatus 300 may control the second communication module to perform communication with at least one external device. Based on the request message and the broadcast message, the vehicle electronic apparatus 300 according to an embodiment of the disclosure may identify information about the communication type supported by the at least one external device within the coverage including the vehicle electronic apparatus. The vehicle electronic apparatus 300 may identify whether to enable or disable the first communication module, based on information about a communication type supported by at least one external device. The vehicle electronic apparatus 300 according to an embodiment of the disclosure may sense a broadcast message or a request message in a time interval allocated for the first communication type. The vehicle electronic apparatus 300 may detect a broadcast message or a request message based on a threshold value. When the broadcast message or the request message is detected, the vehicle electronic apparatus 300 may identify information for requesting a communication type or information about a communication type supported by at least one external device.

The vehicle electronic apparatus 300 according to an embodiment of the disclosure may identify the time interval allocated for the first communication type, based on the result of sensing the broadcast message or the request message.

The time interval allocated for the first communication type according to an embodiment of the disclosure may be statically or dynamically allocated to the vehicle electronic apparatus 300 in order to receive the broadcast message or the request message.

Figure 4B:
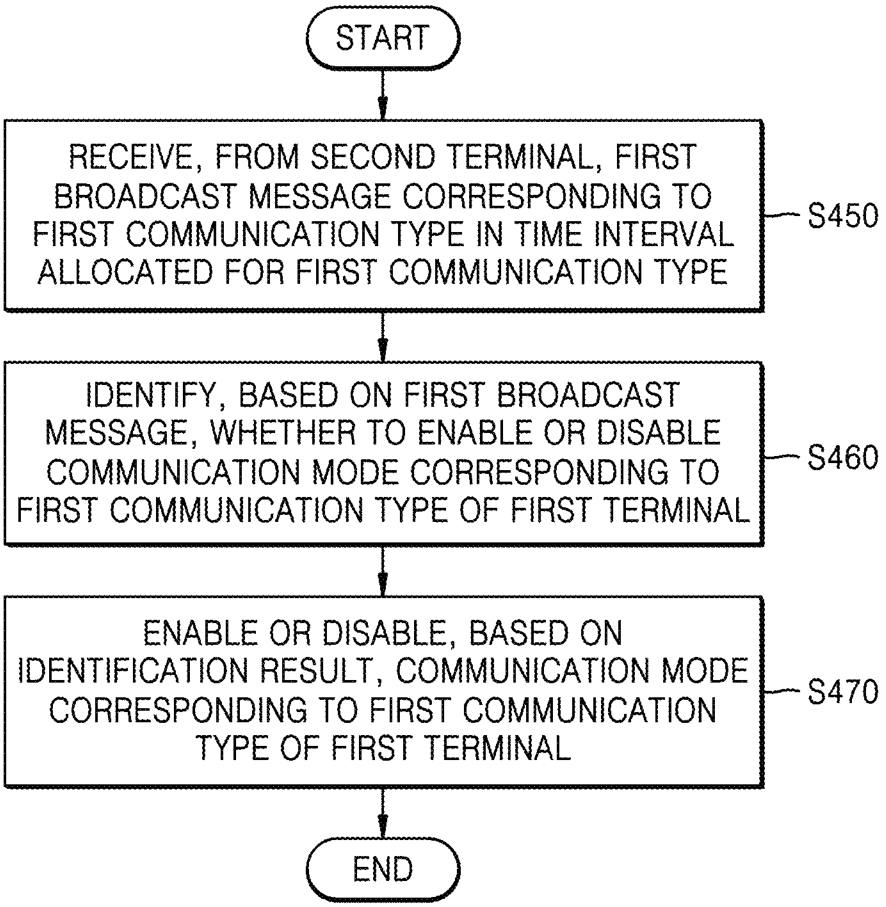
FIG. 4B is a flowchart of a method used by a first terminal installed in a vehicle to perform V2X communication, according to an embodiment of the disclosure.

FIG. 4B is a flowchart of a method by which a first terminal installed in a vehicle performs vehicle-to-everything (V2X) communication, according to an embodiment of the disclosure.

In operation S450, the first terminal 10 may receive a first broadcast message corresponding to the first communication type from the second terminal 20 in a time interval allocated for the first communication type.

The first broadcast message according to an embodiment of the disclosure may include at least one of information for requesting a communication type supported by at least one terminal within the coverage including the second terminal 20 or information indicating a communication type supported by the second terminal 20.

The first terminal 10 according to an embodiment of the disclosure may identify at least one communication type supported by the first terminal 10, based on information for requesting a communication type included in the first broadcast message.

Based on the first broadcast message, the first terminal 10 according to an embodiment of the disclosure may transmit a second broadcast message including information indicating the second communication type in response to the information for requesting the communication type. For example, the second broadcast message may be a message corresponding to the first communication type. The second broadcast message may be broadcast to at least one terminal within the coverage including the first terminal 10.

The time interval allocated for the first communication type according to an embodiment of the disclosure may be statically or dynamically allocated to the first terminal 10 in order to receive the first broadcast message corresponding to the first communication type. The first broadcast message according to an embodiment of the disclosure may be transmitted together with a basic safety message (BSM). The first broadcast message may be transmitted based on a preset period.

The first terminal 10 according to an embodiment of the disclosure may sense a first broadcast message corresponding to the first communication type in a time interval allocated for the first communication type. The first terminal 10 may detect the first broadcast message based on a threshold value. When the first broadcast message is detected, the first terminal 10 may identify at least one of the information for requesting the communication type included in the first broadcast message or the information indicating the communication type supported by the second terminal.

The first terminal 10 according to an embodiment of the disclosure may identify the time interval allocated for the first communication type, based on the result of sensing the first broadcast message corresponding to the first communication type.

In operation S460, based on the first broadcast message, the first terminal 10 may identify whether to enable or disable a communication mode corresponding to the first communication type of the first terminal 10.

Based on the first broadcast message, the first terminal 10 according to an embodiment of the disclosure may receive at least one second broadcast message including information indicating a communication type of another terminal from at least one other terminal within the coverage including the first terminal 10.

Based on the first broadcast message and at least one second broadcast message, the first terminal 10 according to an embodiment of the disclosure may identify a communication type of at least one other terminal within the coverage including the first terminal 10. For example, based on the first broadcast message and at least one second broadcast message, the first terminal 10 may identify whether the communication type of at least one other terminal within the coverage including the first terminal 10 corresponds to the first communication type.

Based on the communication type of at least one other terminal, the first terminal 10 according to an embodiment of the disclosure may identify whether to enable or disable the communication mode corresponding to the first communication type of the first terminal 10. For example, when the communication type of all other terminals within the coverage including the first terminal 10 corresponds to the second communication type, the communication mode corresponding to the first communication type may be disabled. As another example, when the communication type of at least one other terminal within the coverage including the first terminal 10 corresponds to the first communication type, the communication mode corresponding to the first communication type may be enabled. Based on the first broadcast message, the first terminal 10 according to an embodiment of the disclosure may identify information indicating the communication type supported by the second terminal 20.

Based on the information indicating the communication type supported by the second terminal 20, the first terminal 10 according to an embodiment of the disclosure may identify whether to enable or disable the communication mode corresponding to the first communication type of the first terminal 10. For example, the communication mode corresponding to the first communication type of the first terminal 10 may be disabled when the information indicating the communication type supported by the second terminal 20 corresponds to the second communication type.

In operation S470, based on the identification result, the first terminal 10 may identify whether to enable or disable the communication mode corresponding to the first communication type of the first terminal 10.

Figure 5:
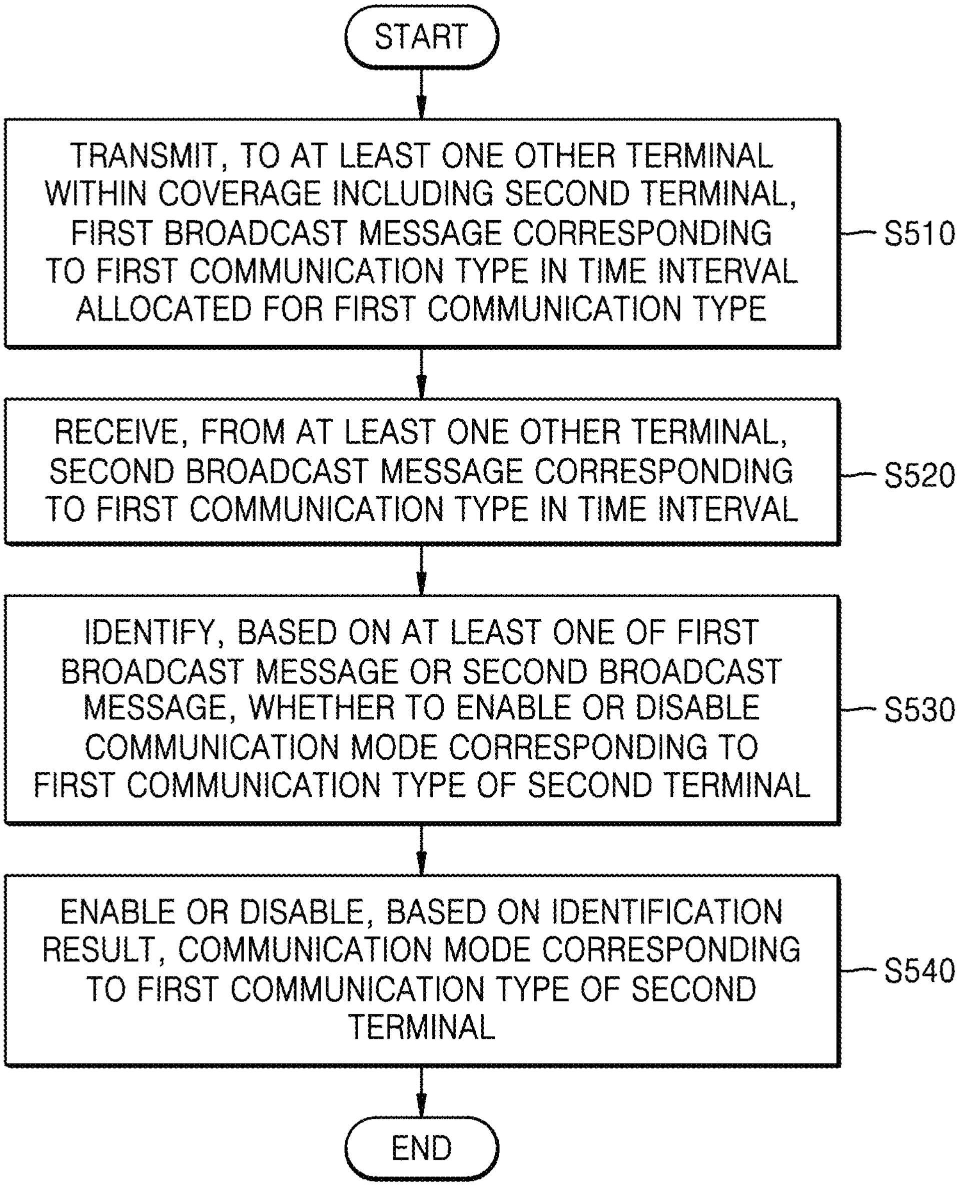
FIG. 5 is a flowchart of a method used by a second terminal installed in a vehicle to perform V2X communication, according to an embodiment of the disclosure.

FIG. 5 is a flowchart of a method by which a second terminal installed in a vehicle performs vehicle-to-everything (V2X) communication, according to an embodiment of the disclosure.

In operation S510, the second terminal 20 may transmit a first broadcast message corresponding to the first communication type to at least one other terminal within the coverage including the second terminal 20 in a time interval allocated for the first communication type.

The first broadcast message according to an embodiment of the disclosure may include at least one of information for requesting a communication type supported by at least one terminal within the coverage including the second terminal 20 or information indicating a communication type supported by the second terminal 20.

The second terminal 20 according to an embodiment of the disclosure may identify the time interval allocated for the first communication type, based on the result of sensing the first broadcast message corresponding to the first communication type.

The time interval allocated for the first communication type according to an embodiment of the disclosure may be statically or dynamically allocated to the first terminal 10 and the second terminal 20 for at least one of transmission or reception of a message corresponding to the first communication type.

The first broadcast message according to an embodiment of the disclosure may be transmitted together with a basic safety message (BSM), and the first broadcast message may be transmitted based on a preset period.

In operation S520, the second terminal 20 may receive a second broadcast message corresponding to the first communication type from at least one other terminal in a time interval.

Based on the first broadcast message, the second terminal 20 according to an embodiment of the disclosure may transmit at least one second broadcast message including information indicating the first communication type or the second communication type in response to the information for requesting the communication type. The second broadcast message according to an embodiment of the disclosure may be broadcast from at least one other terminal within the coverage including the second terminal 20.

In operation S530, based on at least one of the first broadcast message or the second broadcast message, the second terminal 20 may identify whether to enable or disable a communication mode corresponding to the first communication type of the second terminal 20.

Based on the first broadcast message and at least one second broadcast message, the second terminal 20 according to an embodiment of the disclosure may identify a communication type of at least one other terminal within the coverage including the second terminal 20. For example, based on the first broadcast message and at least one second broadcast message, the second terminal 20 may identify whether the communication type of at least one other terminal within the coverage including the second terminal 20 corresponds to the first communication type.

Based on the communication type of at least one terminal, the second terminal 20 according to an embodiment of the disclosure may identify whether to enable or disable the communication mode corresponding to the first communication type of the second terminal 20. For example, when the communication type of all other terminals within the coverage including the second terminal 20 corresponds to the second communication type, the communication mode corresponding to the first communication type may be disabled. As another example, when the communication type of at least one other terminal within the coverage including the second terminal 20 corresponds to the first communication type, the communication mode corresponding to the first communication type may be enabled.

Based on the second broadcast message, the second terminal 20 according to an embodiment of the disclosure may identify information indicating the communication type supported by the at least one other terminal. Based on information indicating the communication type supported by at least one terminal, the second terminal 20 may identify whether to enable or disable the communication mode corresponding to the first communication type of the second terminal 20. For example, the second broadcast message may include information indicating the communication type supported by at least one other terminal within the coverage including the second terminal 20.

For example, when the information indicating the communication type supported by the second terminal 20 corresponds to the second communication type and the communication type supported by at least one terminal corresponds to the first communication type, the communication mode corresponding to the first communication type of the second terminal 20 may be enabled.

In operation S540, based on the identification result, the second terminal 20 may identify whether to enable or disable the communication mode corresponding to the first communication type of the second terminal 20.

Figure 6:
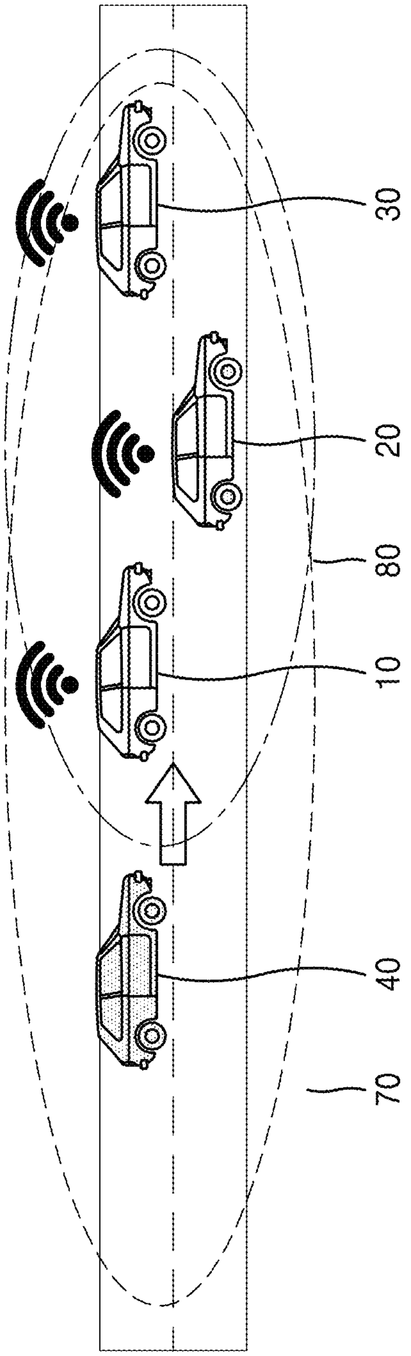
FIG. 6 is a diagram describing a method used by a terminal supporting both long term evolution (LTE) V2X technology and new radio (NR) V2X technology to transmit/receive data, according to an embodiment of the disclosure.

FIG. 6 is a diagram describing a method by which a terminal supporting both LTE V2X technology and NR V2X technology transmits/receives data, according to an embodiment of the disclosure.

A first terminal 10, a second terminal 20, and a third terminal 30 may refer to terminals supporting both the LTE V2X technology and the NR V2X technology. Also, a fourth terminal 40 may refer to a terminal supporting only the LTE V2X technology. A first coverage 70 may refer to a coverage formed for LTE-based V2X. A second coverage 80 may refer to a coverage formed for NR-based V2X. The definitions of the above words may be equally applied in the following drawings.

The first terminal 10, the second terminal 20, and the third terminal 30 may perform data transmission/reception based on at least one of the LTE-based V2X technology or the NR-based V2X technology. The first terminal 10, the second terminal 20, and the third terminal 30 may transmit/receive broadcast messages of the LTE V2X technology and the NR V2X technology. The first terminal 10, the second terminal 20, and the third terminal 30 may perform data transmission/reception based on the NR V2X technology within the second coverage 80.

As illustrated in FIG. 6, when the fourth terminal 40 supporting the LTE-based V2X technology, which is another RAT, enters the second coverage 80, the first coverage 70 may be generated for communication based on the LTE V2X technology with respect to the fourth terminal 440, the first terminal 10, the second terminal 20, and the third terminal 30. At least one of the first terminal 10, the second terminal 20, or the third terminal 30 according to an embodiment of the disclosure may enable a communication mode corresponding to LTE V2X. In order to perform communication with the fourth terminal 40, at least one of the first terminal 10, the second terminal 20, or the third terminal 30 may transmit an LTE-based broadcast message to the fourth terminal 40 and receive an LTE-based broadcast message from the fourth terminal 40.

In the case of FIG. 6, the terminal supporting both the LTE V2X technology and the NR V2X technology (e.g., the first terminal 10, the second terminal 20, and the third terminal 30) may sense an LTE-based broadcast message and enable a communication mode corresponding to LTE V2X according to the sensing result. The terminal supporting both the LTE V2X technology and the NR V2X technology may transmit and receive LTE-based broadcast messages.

Figure 7:
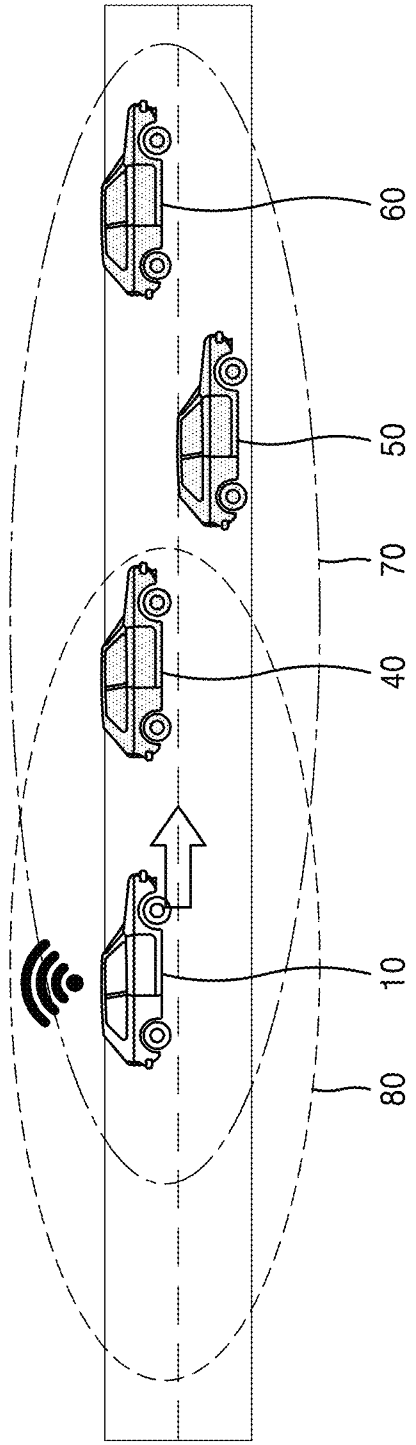
FIG. 7 is a diagram describing a method used by a terminal supporting both LTE V2X technology and NR V2X technology to transmit/receive data, according to an embodiment of the disclosure.

FIG. 7 is a diagram describing a method by which a terminal supporting both LTE V2X technology and NR V2X technology transmits/receives data, according to an embodiment of the disclosure.

A fifth terminal 50 and a sixth terminal 60 may refer to terminals supporting only the LTE V2X technology.

FIG. 7 is a diagram describing an operating method of the first terminal 10 when the first terminal 10 supporting both the LTE V2X technology and the NR V2X technology enters a first coverage 70 that is a coverage formed for LTE-based V2X.

The first terminal 10 may sense an LTE-based broadcast message and enable a communication mode corresponding to LTE V2X according to the sensing result. For example, the first terminal 10 may sense and detect an LTE-based broadcast message transmitted by the fourth terminal 40. The first terminal 10 may transmit and receive LTE-based broadcast messages for communication with the fourth terminal 40 supporting only the LTE V2X technology.

Figure 8:
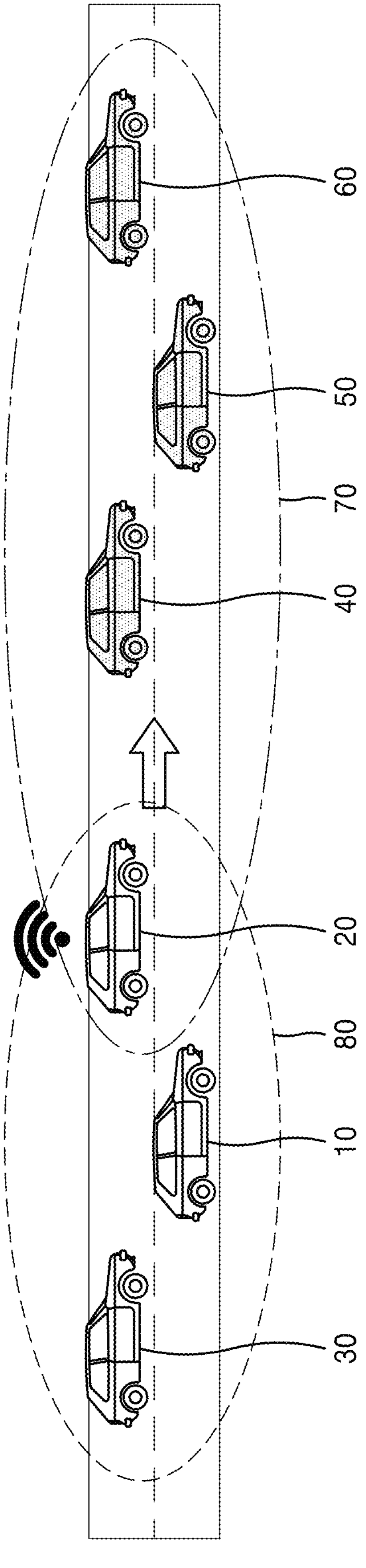
FIG. 8 is a diagram describing an operating method of a terminal supporting both LTE V2X technology and NR V2X technology in a situation where a first coverage and a second coverage overlap each other, according to an embodiment of the disclosure.

FIG. 8 is a diagram describing an operating method of a terminal supporting both LTE V2X technology and NR V2X technology in a situation where a first coverage and a second coverage overlap each other, according to an embodiment of the disclosure. A first terminal 10, a second terminal 20, and a third terminal 30 may refer to terminals supporting both the LTE V2X technology and the NR V2X technology. Also, a fourth terminal 40, a fifth terminal 50, and a sixth terminal 60 may refer to terminals supporting only the LTE V2X technology. A first coverage 70 may refer to a coverage formed for LTE-based V2X. A second coverage 80 may refer to a coverage formed for NR-based V2X.

Referring to FIG. 8, the second terminal 20 may be included in the first coverage 70 and the second coverage 80. The second terminal 20 may transmit an LTE-based broadcast message, and the first terminal 10 and the third terminal 30 may sense the LTE-based broadcast message. According to the existing method, the first terminal 10 and the third terminal 30 may detect an LTE-based broadcast message transmitted by the second terminal 20, and the first terminal 10 and the third terminal 30 may enable a communication mode corresponding to LTE V2X. However, for efficient operation of the terminal, because there is no terminal supporting only the LTE V2X technology within the coverage of the terminal, it may be advantageous that the first terminal 10 and the third terminal 30 do not use the LTE V2X technology.

The first terminal 10 and the third terminal 30 according to an embodiment of the disclosure may disable the communication mode corresponding to LTE V2X of the first terminal 10 and the third terminal 30 according to the method described above with reference to FIG. 4. An operating method between the terminals will be described below in more detail with reference to FIGS. 10 to 13.

Figure 9:
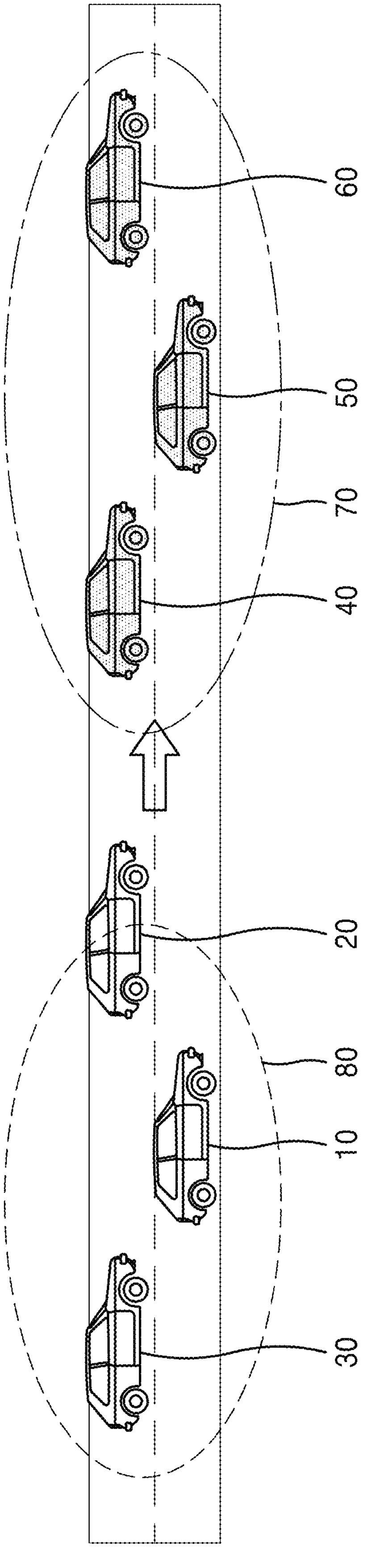
FIG. 9 is a diagram describing an operating method of a terminal supporting both LTE V2X technology and NR V2X technology according to a coverage shift, according to an embodiment of the disclosure.

FIG. 9 is a diagram describing an operating method of a terminal supporting both LTE V2X technology and NR V2X technology according to a coverage shift, according to an embodiment of the disclosure.

A first terminal 10, a second terminal 20, and a third terminal 30 may refer to terminals supporting both the LTE V2X technology and the NR V2X technology. Also, a fourth terminal 40, a fifth terminal 50, and a sixth terminal 60 may refer to terminals supporting only the LTE V2X technology. A first coverage 70 may refer to a coverage formed for LTE-based V2X. A second coverage 80 may refer to a coverage formed for NR-based V2X.

Referring to FIG. 9, the second terminal 20 may move away from the second coverage 80 formed with respect to the first terminal 10 and the third terminal 30 and move to the first coverage 70. The second terminal 20 may transmit an LTE-based broadcast message according to the movement, and the first terminal 10 and the third terminal 30 may sense the LTE-based broadcast message. According to the existing method, the first terminal 10 and the third terminal 30 may detect an LTE-based broadcast message transmitted by the second terminal 20, and the first terminal 10 and the third terminal 30 may enable a communication mode corresponding to LTE V2X. However, for efficient operation of the terminal, because there is no terminal supporting only the LTE V2X technology within the coverage of the terminal, it may be advantageous that the first terminal 10 and the third terminal 30 do not use the LTE V2X technology. Also, when there is no terminal supporting only the LTE V2X technology within the coverage of the second terminal 20, it may be advantageous that the second terminal 20 also does not use the LTE V2X technology.

The first terminal 10 and the third terminal 30 according to an embodiment of the disclosure may disable the communication mode corresponding to LTE V2X of the first terminal 10 and the third terminal 30 according to the method described above with reference to FIG. 4.

The second terminal 20 according to an embodiment of the disclosure may disable the communication mode corresponding to LTE V2X of the second terminal 20 according to the method described above with reference to FIG. 5. An operating method between the terminals will be described below in more detail with reference to FIGS. 10 to 13.

Figure 10:
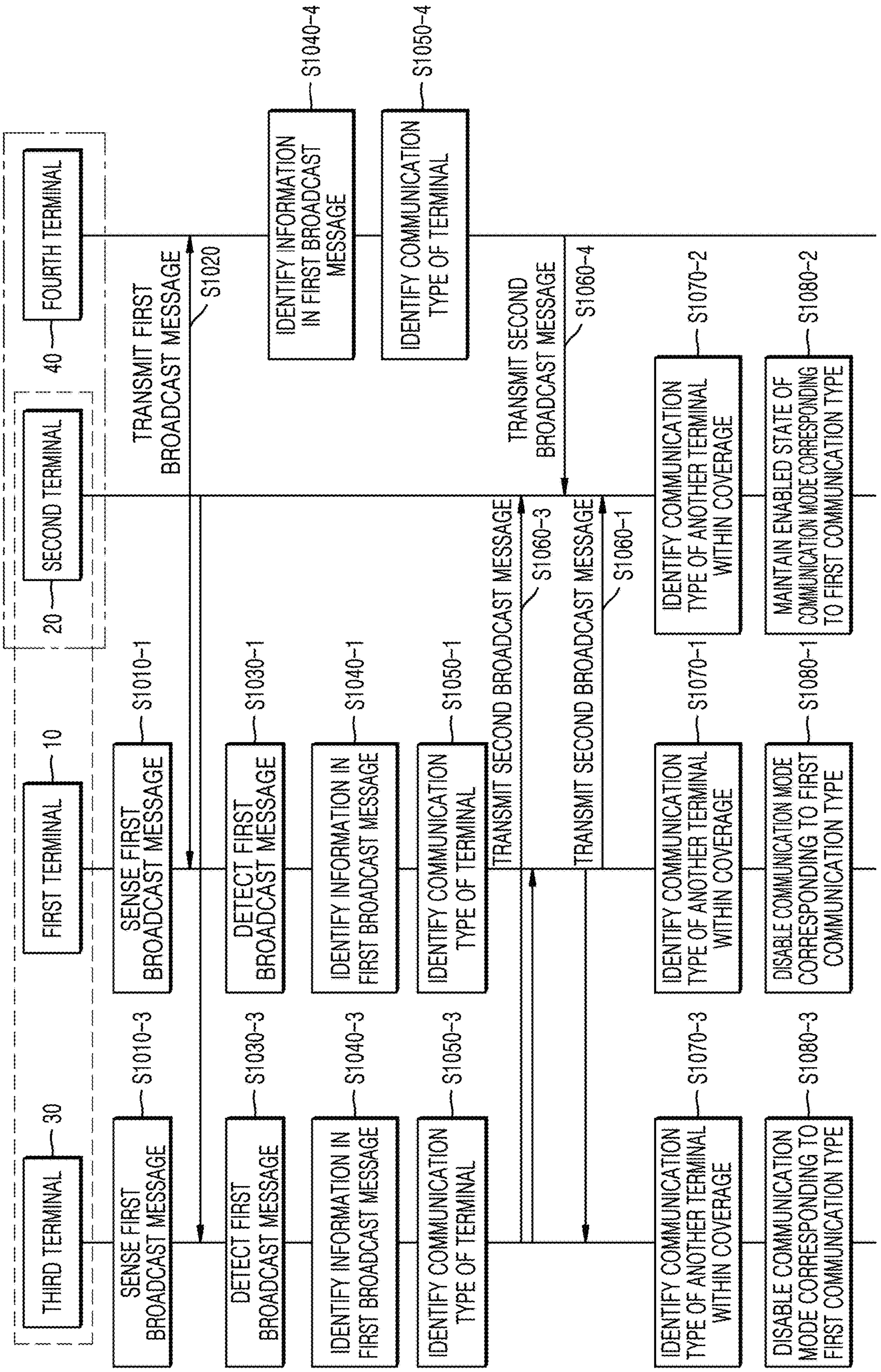
FIG. 10 is a flowchart of transmission/reception of messages by which terminals enable or disable a communication mode corresponding to a first communication type based on request information, according to an embodiment of the disclosure.

FIG. 10 is a flowchart of transmission/reception of messages by which terminals enable or disable a communication mode corresponding to a first communication type based on request information, according to an embodiment of the disclosure.

FIG. 10 is a diagram illustrating a method by which the first terminal 10, the second terminal 20, and the third terminal 30 transmit/receive messages to enable or disable a communication mode corresponding to the first communication type, based on a discovery method using information for requesting a communication type. The first terminal 10, the second terminal 20, and the third terminal 30 may refer to terminals supporting both the first communication type (e.g., the LTE V2X technology) and the second communication type (e.g., the NR V2X technology). The fourth terminal 40 may refer to a terminal supporting only the first communication type.

For example, by using LTE V2X, the second terminal 20 may transmit a first broadcast message for requesting a return of a device type of a terminal receiving a message (e.g., the first terminal 10, the second terminal 20, or the fourth terminal 40). Here, the device type may refer to at least one communication type supported by the terminal and may refer to, for example, at least one communication type among the first communication type (e.g., the LTE V2X technology) or the second communication type (e.g., the NR V2X technology) supported by the terminal. Based on the message received from the first terminal 10, the third terminal 30, and the fourth terminal 40, the second terminal 20 may identify which communication type the terminal around the second terminal 20 supports. The second terminal 20 may determine whether to enable or disable the communication mode corresponding to the first communication type.

For example, when broadcasting a basic safety message (BSM), the second terminal 20 may also transmit a first broadcast message (e.g., a request message including request information). A method of transmitting/receiving the first broadcast message together with the BSM may use a separate application layer operating in an upper layer in consideration of the current standard protocol. For example, the BSM may be periodically broadcast and transmitted. When an application is installed, an application layer may be transmitted by being attached to the BSM. For example, request information may be included and transmitted in the application layer. The terminal having received the BSM may decode each of information included in the BSM and information included in the application layer. The present embodiment may have an advantage that it may be applied to a communication system without modification of the standard protocol proposed by the 3GPP. Operations of the terminals will be described below in more detail.

In operations S1010-1 and S1010-3, the first terminal 10 and the third terminal 30 may sense the first broadcast message. In the time interval and frequency channel allocated for the first communication type, the first terminal 10 and the third terminal 30 may perform sensing to identify whether another terminal transmits a signal or message corresponding to the first communication type. For example, the first terminal 10 and the third terminal 30 may scan the frequency of a radio frequency (RF) signal corresponding to an LTE signal and identify whether there is an LTE signal.

In operation S1020, the second terminal 20 may transmit the first broadcast message to the terminals included in the coverage thereof. The second terminal 20 may broadcast the first broadcast message to the first terminal 10, the third terminal 30, and the fourth terminal 40 in the time interval and frequency channel allocated for the first communication type. For example, the second terminal 20 may transmit the first broadcast message together with the periodically transmitted BSM.

For example, a period in which the BSM is transmitted may be the same as a period in which the first broadcast message is transmitted. When the BSM is transmitted 10 times per second, the application layer may also be transmitted 10 times per second. As another example, a period in which the BSM is transmitted may be different from a period in which the first broadcast message is transmitted. When the BSM is transmitted 10 times per second, the application layer may be transmitted only 5 times per second.

In operations S1030-1 and S1030-3, the first terminal 10 and the third terminal 30 may detect the first broadcast message. For example, the first terminal 10 and the third terminal 30 may identify whether the reception strength of the LTE signal is greater than or equal to a threshold value and may detect a corresponding frequency when the reception strength of the LTE signal is greater than or equal to the threshold value. The first terminal 10 and the third terminal 30 according to an embodiment of the disclosure may identify a received signal strength indicator (RSSI) of the first broadcast message corresponding to the first communication type. The first terminal 10 and the third terminal 30 may compare the RSSI of the first broadcast message with a threshold value. The first terminal 10 and the third terminal 30 may identify the validity of the first broadcast message when the RSSI of the first broadcast message is greater than the threshold value.

The first terminal 10 and the third terminal 30 according to an embodiment of the disclosure may operate a modem (e.g., LTE V2X modem) corresponding to the first communication type in order to identify the first broadcast message.

In operations S1040-1, S1040-3, and S1040-4, the first terminal 10, the third terminal 30, and the fourth terminal 40 may identify information in the first broadcast message transmitted by the second terminal 20. For example, the first terminal 10, the third terminal 30, and the fourth terminal 40 may identify whether the signal transmitted by the second terminal 20 is a real LTE-based data signal or noise. When it is not noise, the first terminal 10, the third terminal 30, and the fourth terminal 40 may identify data corresponding to the corresponding signal.

The first terminal 10, the third terminal 30, and the fourth terminal 40 according to an embodiment of the disclosure may identify information for requesting the communication type supported by at least one terminal within the coverage including the second terminal 20 included in the first broadcast message.

In operations S1050-1, S1050-3, and S1050-4, the first terminal 10, the third terminal 30, and the fourth terminal 40 may identify whether the communication type of the terminal is the first communication type or the second communication type.

For example, the terminals supporting the first communication type and the second communication type may communicate with signals corresponding to the second communication type (e.g., NR). Thus, the first terminal 10 and the third terminal 30 may identify the communication type of the terminal as the second communication type. On the other hand, because the fourth terminal 40 corresponds to the terminal supporting only the first communication type, the communication type of the terminal may be identified as the first communication type.

In operations S1060-1, S1060-3, and S1060-4, the first terminal 10, the third terminal 30, and the fourth terminal 40 may transmit a second broadcast message including information indicating the communication type of each terminal (e.g., the first communication type or the second communication type). For example, the second broadcast message may be a message corresponding to the first communication type. In operation S1060-1, the first terminal 10 may transmit a second broadcast message including information indicating the second communication type (e.g., the NR V2X technology) to the third terminal 30 and the second terminal 20 included in the coverage of the first terminal 10.

In operation S1060-3, the third terminal 30 may transmit a second broadcast message including information indicating the second communication type (e.g., the NR V2X technology) to the first terminal 10 and the second terminal 20 included in the coverage of the third terminal 30.

In operation S1060-4, the fourth terminal 40 may transmit a second broadcast message including information indicating the first communication type (e.g., the LTE V2X technology) to the second terminal 20 included in the coverage of the fourth terminal 40. In operations S1070-1, S1070-2, and S1070-3, the first terminal 10, the second terminal 20, and the third terminal 30 may identify the communication type of another terminal within the coverage thereof.

According to an embodiment of the disclosure, only the terminal (e.g., the NR terminal) supporting the first communication type and the second communication type may transmit the first broadcast message. Thus, the terminal having received the first broadcast message may identify that the terminal having transmitted the first broadcast message is the terminal supporting the second communication type.

In operation S1070-1, based on the second broadcast message including information indicating the second communication type (e.g., the NR V2X technology) received from the third terminal 30 and the first broadcast message received from the second terminal 20, the first terminal 10 may identify that there are two terminals supporting the second communication type in the coverage of the first terminal 10. Also, the first terminal 10 may identify that there is no terminal supporting the first communication type in the coverage of the first terminal 10.

In operation S1070-2, based on the second broadcast message including information indicating the second communication type (e.g., the NR V2X technology) received from the third terminal 30, the second broadcast message including information indicating the second communication type (e.g., the NR V2X technology) received from the first terminal 10, and the second broadcast message including information indicating the first communication type (e.g., the LTE V2X technology) received from the fourth terminal 40, the second terminal 20 may identify that there are two terminals supporting the second communication type and one terminal supporting the first communication type in the coverage of the second terminal 20.

In operation S1070-3, based on the second broadcast message including information indicating the second communication type (e.g., the NR V2X technology) received from the first terminal 10 and the first broadcast message received from the second terminal 20, the third terminal 30 may identify that there are two terminals supporting the second communication type in the coverage of the third terminal 30. Also, the third terminal 30 may identify that there is no terminal supporting the first communication type in the coverage of the third terminal 30.

In operations S1080-1, S1080-2, and S1080-3, the first terminal 10, the second terminal 20, and the third terminal 30 may identify whether to enable or disable a communication mode corresponding to the first communication type. Also, based on the identification result, the first terminal 10, the second terminal 20, and the third terminal 30 may enable or disable the communication mode corresponding to the first communication type.

In operation S1080-1, because the first terminal 10 does not need to transmit/receive a signal corresponding to the first communication type, the first terminal 10 may disable the communication mode corresponding to the first communication type.

In operation S1080-2, because the second terminal 20 needs to transmit/receive a signal corresponding to the first communication type, the second terminal 20 may maintain the enabled state of the communication mode corresponding to the first communication type.

In operation S1080-3, because the third terminal 30 does not need to transmit/receive a signal corresponding to the first communication type, the third terminal 30 may disable the communication mode corresponding to the first communication type.

The first terminal 10 and the third terminal 30 according to an embodiment of the disclosure may disable the communication mode corresponding to the first communication type in an environment where communication corresponding to the first communication type is not necessary.

Figure 11:
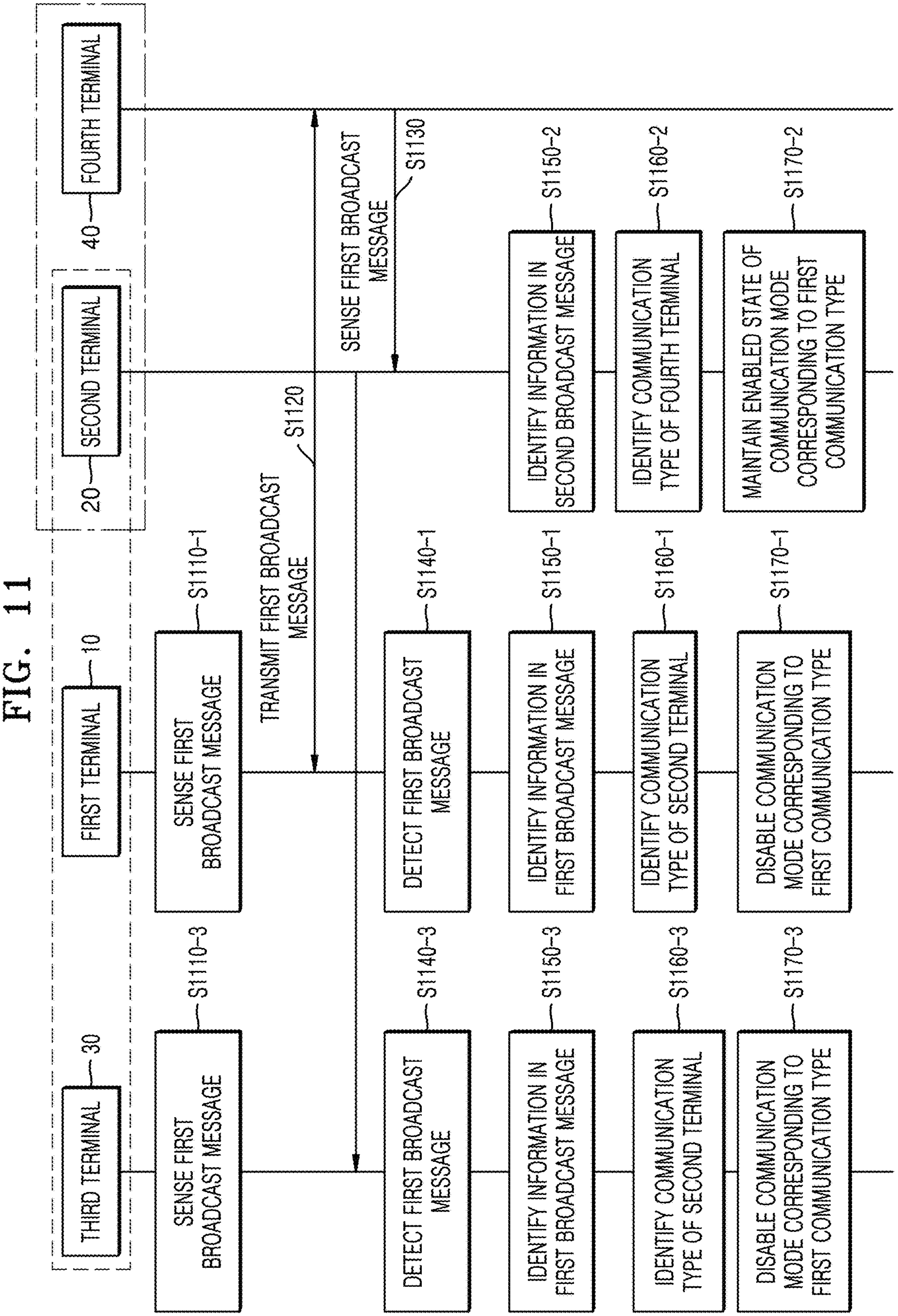
FIG. 11 is a flowchart of transmission/reception of messages by which terminals enable or disable a communication mode corresponding to a first communication type based on indication information, according to an embodiment of the disclosure.

FIG. 11 is a flowchart of transmission/reception of messages by which terminals enable or disable a communication mode corresponding to a first communication type based on indication information, according to an embodiment of the disclosure.

FIG. 11 is a diagram illustrating a method by which the first terminal 10, the second terminal 20, and the third terminal 30 transmit/receive messages to enable or disable a communication mode corresponding to the first communication type, based on an indicator method using information indicating a communication type.

For example, by using LTE V2X, the second terminal 20 may transmit a first broadcast message including indication information indicating the communication type supported by the second terminal 20, such that the first terminal 10 and the third terminal 30 may know about the RAT supported by the second terminal 20. Based on the message received from the second terminal 20, the first terminal 10 and the third terminal 30 may identify which communication type the second terminal 20 supports. The first terminal 10 and the third terminal 30 may determine whether to enable or disable the communication mode corresponding to the first communication type. For example, the first terminal 10 and the third terminal 30 may maintain the disabled state of the communication mode corresponding to the first communication type when information indicated by the first broadcast message is the second communication type (e.g., the NR V2X technology). As another example, the first terminal 10 and the third terminal 30 may change the communication mode corresponding to the first communication type into an enabled state when information indicated by the first broadcast message is the first communication type (e.g., the LTE V2X technology).

For example, when broadcasting a basic safety message (BSM), the second terminal 20 may also transmit a first broadcast message (e.g., a message including indication information). A method of transmitting/receiving the first broadcast message together with the BSM may use a separate application layer operating in an upper layer in consideration of the current standard protocol. For example, the BSM may be periodically broadcast and transmitted. When an application is installed, an application layer may be transmitted by being attached to the BSM. For example, indicator information may be included and transmitted in the application layer. The terminal having received the BSM may decode each of information included in the BSM and information included in the application layer. The present embodiment may have an advantage that it may be applied to a communication system without modification of the standard protocol proposed by the 3GPP.

Operations of the terminals will be described below in more detail. Redundant descriptions with those provided above will be omitted for conciseness.

In operations S1110-1 and S1110-3, the first terminal 10 and the third terminal 30 may sense the first broadcast message.

In operation S1120, the second terminal 20 may transmit the first broadcast message to the terminals included in the coverage thereof. The first broadcast message according to an embodiment of the disclosure may include information indicating the second communication type that is the communication type supported by the second terminal 20.

Information indicating the communication type according to an embodiment of the disclosure may correspond to a preset value, and as a non-limiting example, information indicating the first communication type may correspond to 0 and information indicating the second communication type may correspond to 1.

In operation S1130, the fourth terminal 40 may transmit a second broadcast message to the terminals included in the coverage thereof. The second broadcast message according to an embodiment of the disclosure may include a first communication type that is a communication type supported by the fourth terminal 40. The second broadcast message according to an embodiment of the disclosure may correspond to the first communication type.

In operations S1140-1 and S1140-3, the first terminal 10 and the third terminal 30 may detect the first broadcast message. For example, the first terminal 10 and the third terminal 30 may identify whether the reception strength of the LTE signal is greater than or equal to a threshold value and may detect a corresponding frequency when the reception strength of the LTE signal is greater than or equal to the threshold value.

In operations S1150-1 and S1150-3, the first terminal 10 and the third terminal 30 may identify information in the first broadcast message transmitted by the second terminal 20. The first terminal 10 and the third terminal 30 according to an embodiment of the disclosure may identify information indicating the communication type supported by the second terminal 20 included in the first broadcast message.

In operation S1150-2, the second terminal 20 may identify information in the second broadcast message transmitted by the fourth terminal 40.

In operations S1160-1 and S1160-3, the first terminal 10 and the third terminal 30 may identify the communication type of the second terminal 20 based on the information in the first broadcast message transmitted by the second terminal 20. In operation S1160-2, the second terminal 20 may identify the communication type of the fourth terminal 40 based on the information in the second broadcast message transmitted by the fourth terminal 40.

In operations S1170-1, S1170-2, and S1170-3, the first terminal 10, the second terminal 20, and the third terminal 30 may identify whether to enable or disable a communication mode corresponding to the first communication type. Also, based on the identification result, the first terminal 10, the second terminal 20, and the third terminal 30 may enable or disable the communication mode corresponding to the first communication type.

In operation S1170-1, because the first terminal 10 does not need to transmit/receive a signal corresponding to the first communication type, the first terminal 10 may disable the communication mode corresponding to the first communication type.

In operation S1170-2, because the second terminal 20 does need to transmit/receive a signal corresponding to the first communication type, the second terminal 20 may maintain the enabled state of the communication mode corresponding to the first communication type.

In operation S1170-3, because the third terminal 30 does not need to transmit/receive a signal corresponding to the first communication type, the third terminal 30 may disable the communication mode corresponding to the first communication type.

The first terminal 10 and the third terminal 30 according to an embodiment of the disclosure may disable the communication mode corresponding to the first communication type in an environment where communication corresponding to the first communication type is not necessary.

When the terminal senses a signal corresponding to LTE V2X, the terminal may determine a received signal strength indicator (RSSI) of the frequency channel of the signal corresponding to LTE V2X. When the RSSI of the signal corresponding to LTE V2X is greater than a threshold value, the terminal may enable a corresponding LTE modem. The terminal may determine the validity of the signal corresponding to LTE V2X. The terminal may statically maintain or dynamically change a period for performing sensing.

For example, the terminal may increase the NR V2X usage efficiency by statically maintaining or dynamically changing a period of a subframe for performing sensing. FIGS. 12A, 12B, 13A, and 13B illustrate an embodiment of a method of allocating time resources for performing sensing.

Figure 12A:
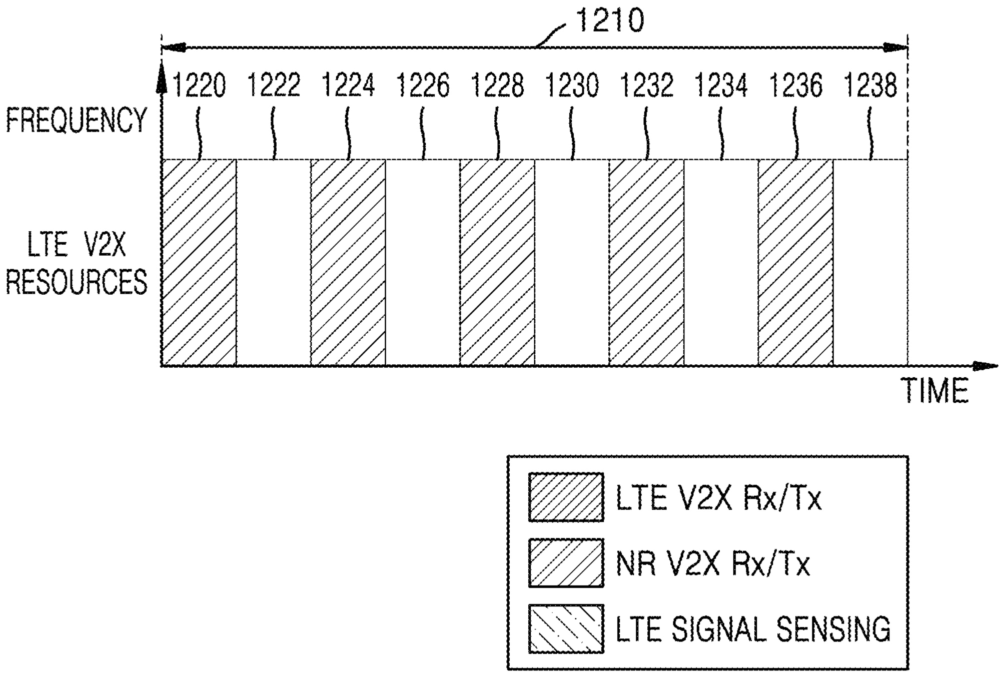
FIG. 12A is a diagram describing a method of performing sensing by using a static period, according to an embodiment of the disclosure.
Figure 12B:
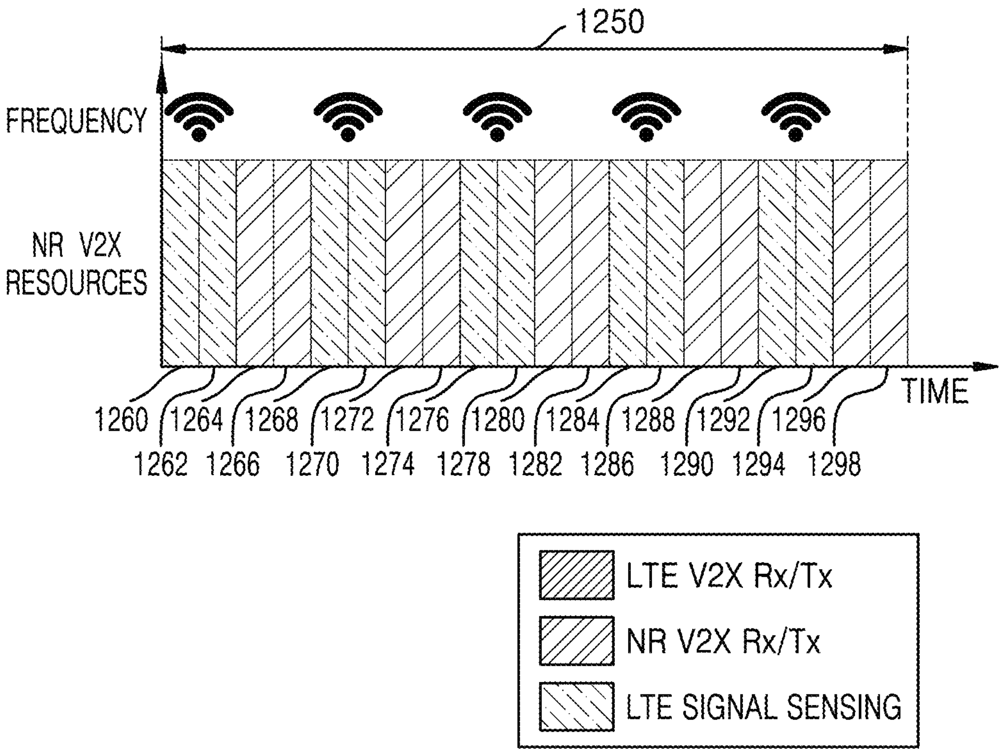
FIG. 12B is a diagram describing a method of performing sensing by using a static period, according to an embodiment of the disclosure.

FIGS. 12A and 12B describe a method of performing sensing by using a static period, according to an embodiment of the disclosure.

Turning now to FIG. 12A, in the case of subframes with a subcarrier spacing (SCS) of 15 KHz supported in LTE, one frame 1210 may include a first subframe 1220, a second subframe 1222, a third subframe 1224, a fourth subframe 1226, a fifth subframe 1228, a sixth subframe 1230, a seventh subframe 1232, an eighth subframe 1234, a ninth subframe 1236, and a tenth subframe 1238. One frame 1210 may correspond to 10 ms. Turning now to FIG. 12B, a frame 1250 with an SCS of 30 KHz supported in NR may include 20 time intervals. The frame 1250 may include a first time interval 1260, a second time interval 1262, a third time interval 1264, a fourth time interval 1266, a fifth time interval 1268, a sixth time interval 1270, a seventh time interval 1272, an eighth time interval 1274, a ninth time interval 1276, a tenth time interval 1278, an 11th time interval 1280, a 12th time interval 1282, a 13th time interval 1284, a 14th time interval 1286, a 15th time interval 1288, a 16th time interval 1290, a 17th time interval 1292, an 18th time interval 1294, a 19th time interval 1296, and a 20th time interval 1298. One time interval may correspond to a subframe or a slot. One frame (e.g., the frame 1250) may correspond to 10 ms.

FIGS. 12A and 12B are diagrams describing a method by which a terminal senses a first broadcast message based on a static TDM allocation method.

Referring to FIG. 12A, the first subframe 1220, the third subframe 1224, the fifth subframe 1228, the seventh subframe 1232, and the ninth subframe 1236 may be allocated for transmission and reception for LTE V2X. The fourth terminal 40 may transmit/receive an LTE-based broadcast message in the corresponding subframes.

Referring to FIG. 12B, the third time interval 1264, the fourth time interval 1266, the seventh time interval 1272, the eighth time interval 1274, the 11th time interval 1280, the 12th time interval 1282, the 15th time interval 1288, the 16th time interval 1290, the 19th time interval 1296, and the 20th time interval 1298, which are time intervals corresponding to the second subframe 1222, the fourth subframe 1226, the sixth subframe 1230, the eighth subframe 1234, and the tenth subframe 1238, may be allocated for transmission and reception for NR V2X.

In the time intervals allocated for transmission and reception for LTE V2X (e.g., the first time interval 1260, the second time interval 1262, the fifth time interval 1268, the sixth time interval 1270, the ninth time interval 1276, the tenth time interval 1278, the 13th time interval 1284, the 14th time interval 1286, the 17th time interval 1292, and the 18th time interval 1294), the first terminal 10 according to an embodiment of the disclosure may sense an LTE signal. For example, the second terminal 20 may transmit the first broadcast message in the corresponding time intervals. The first terminal 10 may sense and detect the first broadcast message in the corresponding time intervals.

According to the existing method, the first terminal 10 supporting both the LTE V2X technology and the NR V2X technology had to operate an LTE modem in the first time interval 1260 and the second time interval 1262 corresponding to the first subframe 1220 and had to operate an NR modem in the third time interval 1264 and the fourth time interval 1266 corresponding to the second subframe 1222.

However, the first terminal 10 according to an embodiment of the disclosure may or may not operate the LTE modem according to the identification result in the first time interval 1260 and the second time interval 1262 (i.e., on/off possible). That is, while the first terminal 10 is sensing an LTE signal, in a state where the LTE modem is not operated, the first terminal 10 may identify whether another terminal included in the coverage thereof transmits an LTE-based message. Thus, the terminal according to an embodiment of the disclosure may reduce the power consumption for turning on the LTE modem itself.

Also, according to the existing method, in order to transmit a BSM, the terminal had to perform transmission in the time interval allocated for transmission and reception for LTE V2X. However, according to an embodiment of the disclosure, when it is identified that transmission of an LTE signal is not necessary, the terminal may not perform transmission in the time interval allocated for transmission and reception for LTE V2X. As a result, the power consumption of the first terminal may be reduced, and the efficiency of radio resources may be increased.

Figure 13A:
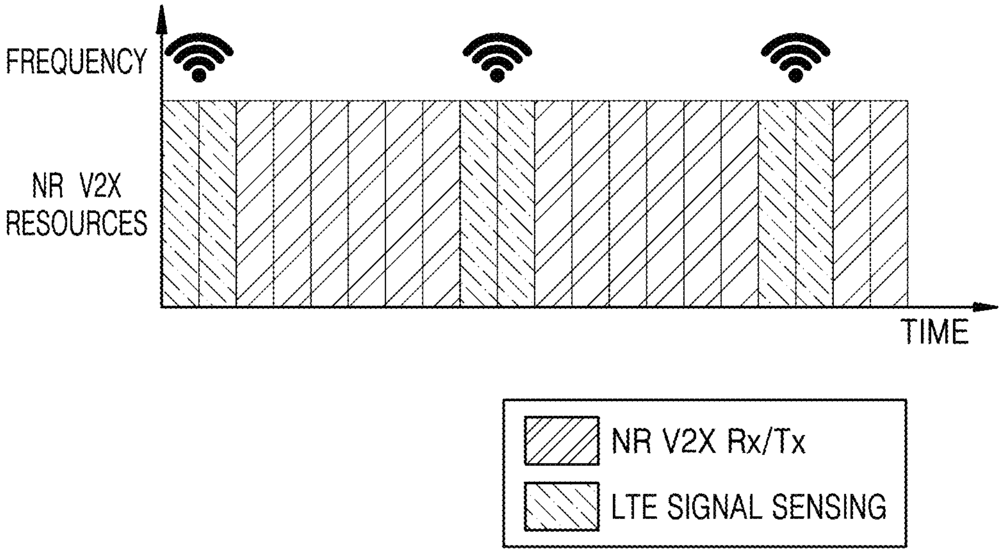
FIG. 13A is a diagram describing a method of performing sensing by using a dynamic period, according to an embodiment of the disclosure.

FIG. 13A is a diagram describing a method of performing sensing by using a dynamic period, according to an embodiment of the disclosure.

FIG. 13A is a diagram describing a method in which the first terminal 10 senses the first broadcast message based on a dynamic TDM allocation method.

Based on the result of sensing the LTE signal, the first terminal 10 may dynamically determine the number of time intervals for transmitting/receiving the LTE V2X signal and the number of time intervals for transmitting/receiving the NR V2X signal.

Referring to FIGS. 12A and 12B, 10 time intervals among a total of 20 time intervals are allocated to the terminal supporting both LTE and NR to sense the LTE signal, and the other 10 time intervals are allocated to the terminal supporting both LTE and NR to transmit and receive the NR signal.

Referring to FIG. 13A, 6 time intervals among a total of 20 time intervals may be allocated to the terminal supporting both LTE and NR to sense the LTE signal. The other 14 time intervals may be allocated to the terminal supporting both LTE and NR to transmit and receive the NR signal.

Figure 13B:
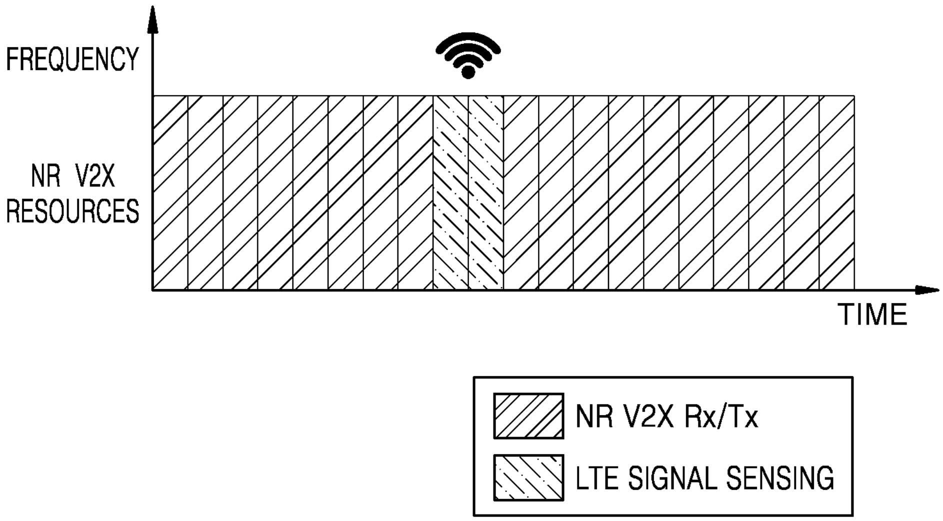
FIG. 13B is a diagram describing a method of performing sensing by using a dynamic period, according to an embodiment of the disclosure.

FIG. 13B is a diagram describing a method of performing sensing by using a dynamic period, according to an embodiment of the disclosure. FIG. 13B is a diagram describing a method in which the first terminal 10 senses the first broadcast message based on a dynamic TDM allocation method.

Referring to FIG. 13B, 2 time intervals among a total of 20 time intervals may be allocated to the terminal supporting both LTE and NR to sense the LTE signal. The other 18 time intervals may be allocated to the terminal supporting both LTE and NR to transmit and receive the NR signal.

The above embodiment relates to a method of dynamically adjusting a resource allocation ratio corresponding to the RAT according to the surrounding situations of the first terminal 10. It may be effective in that the terminal may maximize and use the NR V2X technology while maintaining the advantages of the static TDM allocation method.

In an embodiment of the disclosure, at least one of the operations performed by the processor 330 may be performed by using artificial intelligence (AI) technology. At least one operation performed by using AI technology will be described below in detail with reference to FIGS. 14 to 16.

Figure 14:
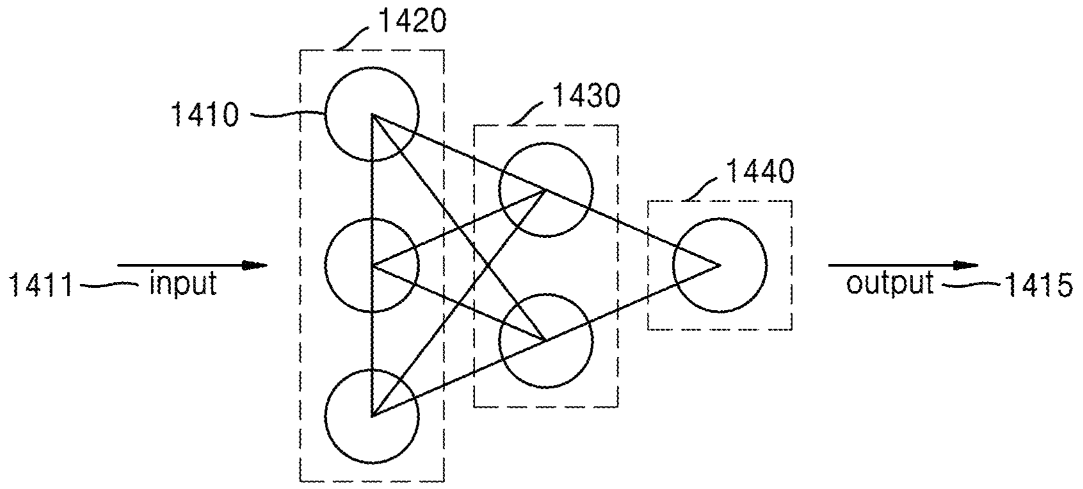
FIG. 14 is a diagram describing an operation performed by using artificial intelligence technology, in an embodiment of the disclosure.

FIG. 14 is a diagram describing an operation performed by using artificial intelligence technology, in an embodiment of the disclosure.

Particularly, at least one of "i) an operation of controlling the first communication module to receive, from the at least one external device, a broadcast message indicating information about a communication type supported by the at least one external device, ii) an operation of disabling the first communication module based on the broadcast message, or iii) an operation of controlling the second communication module to perform communication with the at least one external device", which are performed by the processor 330, may be performed by using the AI technology for performing operations through a neural network.

Artificial intelligence technology (hereinafter referred to as "AI technology") may be a technology for obtaining a desired result by processing (e.g., analyzing and/or classifying) input data by performing an operation through a neural network.

The AI technology may be implemented by using an algorithm. Here, an algorithm or a set of algorithms for implementing the AI technology may be referred to as a neural network. Here, the neural network may receive input data, perform an operation for analysis and/or classification, and output result data. As such, in order for the neural network to accurately output the result data corresponding to the input data, it may be necessary to train the neural network. Here, "training" may represent training the neural network such that the neural network may personally find and learn a method of inputting various data into the neural network and analyzing the input data, a method of classifying the input data, and/or a method of extracting features necessary for generating result data from the input data. Particularly, through a training process, the neural network may optimize and set the weight values in the neural network based on training data (e.g., a plurality of different images). A desired result may be output by self-learning the input data through the neural network having the optimized weight values.

Particularly, the neural network may be classified as a deep neural network when the neural network includes a plurality of hidden layers as internal layers for performing an operation, that is, when the depth of the neural network for performing an operation increases. Examples of the neural network may include, but are not limited to, Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), and Deep Q-Networks. Also, the neural network may be subdivided. For example, the CNN neural network may be subdivided into Deep Convolution Neural Networks (DCNNs) or CapsNet neural networks (not shown).

In an embodiment of the disclosure, an "AI model" may refer to a neural network including at least one layer that receives input data and operates to output a desired result. Also, the "AI model" may refer to an algorithm or a set of algorithms for outputting a desired result by performing an operation through a neural network, a processor for executing the algorithm (or the set of algorithms), software for executing the algorithm (or the set of algorithms), or hardware for executing the algorithm (or the set of algorithms).

Referring to FIG. 14, a neural network 1410 may be trained by receiving training data. The trained neural network 1410 may perform an operation of receiving input data 1411 through an input terminal 1420, analyzing the input data 1411, and outputting output data 1415 as a desired result through an output terminal 1440. An operation through a neural network may be performed through a hidden layer 1430. In FIG. 14, for convenience, the hidden layer 1430 is illustrated as being formed as a single layer; however, the hidden layer 1430 may be formed as a plurality of layers.

Particularly, in an embodiment of the disclosure, the neural network 1410 may be trained to control the first communication module to receive, from the at least one external device, a broadcast message indicating information about a communication type supported by the at least one external device. Also, in an embodiment of the disclosure, the neural network 1410 may be trained to disable the first communication module based on the broadcast message. Also, in an embodiment of the disclosure, the neural network 1410 may be trained to control the second communication module to perform communication with the at least one external device.

In an embodiment of the disclosure, the neural network 1410 may be trained to identify the time interval allocated for the first communication type, based on the result of sensing the first broadcast message corresponding to the first communication type.

In an embodiment of the disclosure, it may be distinguished from the vehicle electronic apparatus 300 performing at least one of "i) an operation of controlling the first communication module to receive, from the at least one external device, a broadcast message indicating information about a communication type supported by the at least one external device, ii) an operation of disabling the first communication module based on the broadcast message, or iii) an operation of controlling the second communication module to perform communication with the at least one external device" described above, and may be implemented in a separate electronic apparatus (not shown) or a processor (not shown) located in the vehicle.

Also, the operation through the neural network described above may be performed by a server (not shown) that may communicate with the vehicle electronic apparatus 300 according to an embodiment of the disclosure through a wireless communication network. The communication between the vehicle electronic apparatus 300 and the server (not shown) will be described below in detail with reference to FIGS. 15 and 16. The neural network may be implemented in the processor (e.g., 330 of FIG. 3).

Figure 15:
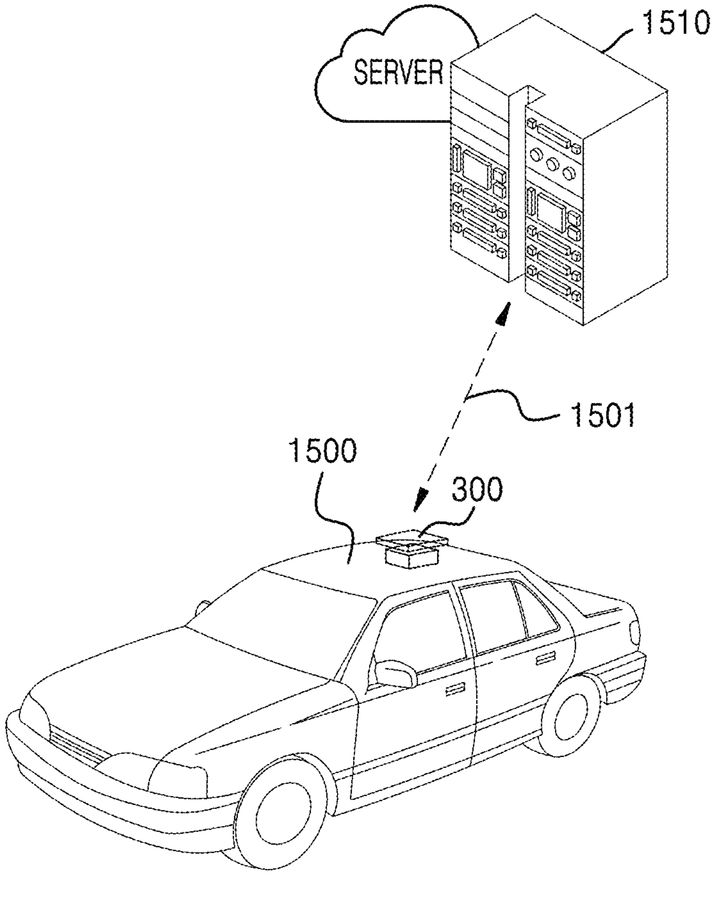
FIG. 15 is a diagram illustrating an electronic apparatus operating in conjunction with a server, according to an embodiment of the disclosure.

FIG. 15 is a diagram illustrating an electronic apparatus operating in conjunction with a server, according to an embodiment of the disclosure.

A server 1510 may include a server, a server system, a server-based apparatus, or the like that transmits/receives data to/from an electronic apparatus, for example, the vehicle electronic apparatus 300, through a communication network 1501 and processes data. Particularly, the vehicle electronic apparatus 300 may be an electronic apparatus located in a vehicle 1500 and may be the first terminal 10, the second terminal 20, or the third terminal 30 according to an embodiment of the disclosure.

In an embodiment of the disclosure, the server 1510 may include a communicator 1630 communicating with the vehicle electronic apparatus 300 and a processor 1650 executing at least one instruction.

In an embodiment of the disclosure, the server 1510 may train an AI model and store the trained AI model. By using the trained AI model, the server 1510 may perform at least one of i) an operation of controlling the first communication module to receive, from the second terminal, a first broadcast message corresponding to the first communication type in a time interval allocated for the first communication type, ii) an operation of identifying, based on the first broadcast message, whether to enable or disable a communication mode corresponding to the first communication type of the first terminal, or iii) an operation of enabling or disabling, based on the identification result, the communication mode corresponding to the first communication type of the first terminal.

In general, in terms of the memory storage capacity, the operation processing speed, the collection capability of a training data set, and/or the like, the vehicle electronic apparatus 300 may be restricted compared to the server 1510. Thus, after the server 1510 performs an operation requiring storage of a large amount of data and a large amount of computation, necessary data and/or an AI model to be used may be transmitted to the vehicle electronic apparatus 300 through the communication network. Then, the vehicle electronic apparatus 300 may rapidly and easily perform a necessary operation without a processor having a large-capacity memory and a fast operation capability by receiving and using the necessary data and/or the AI model through the server.

Figure 16:
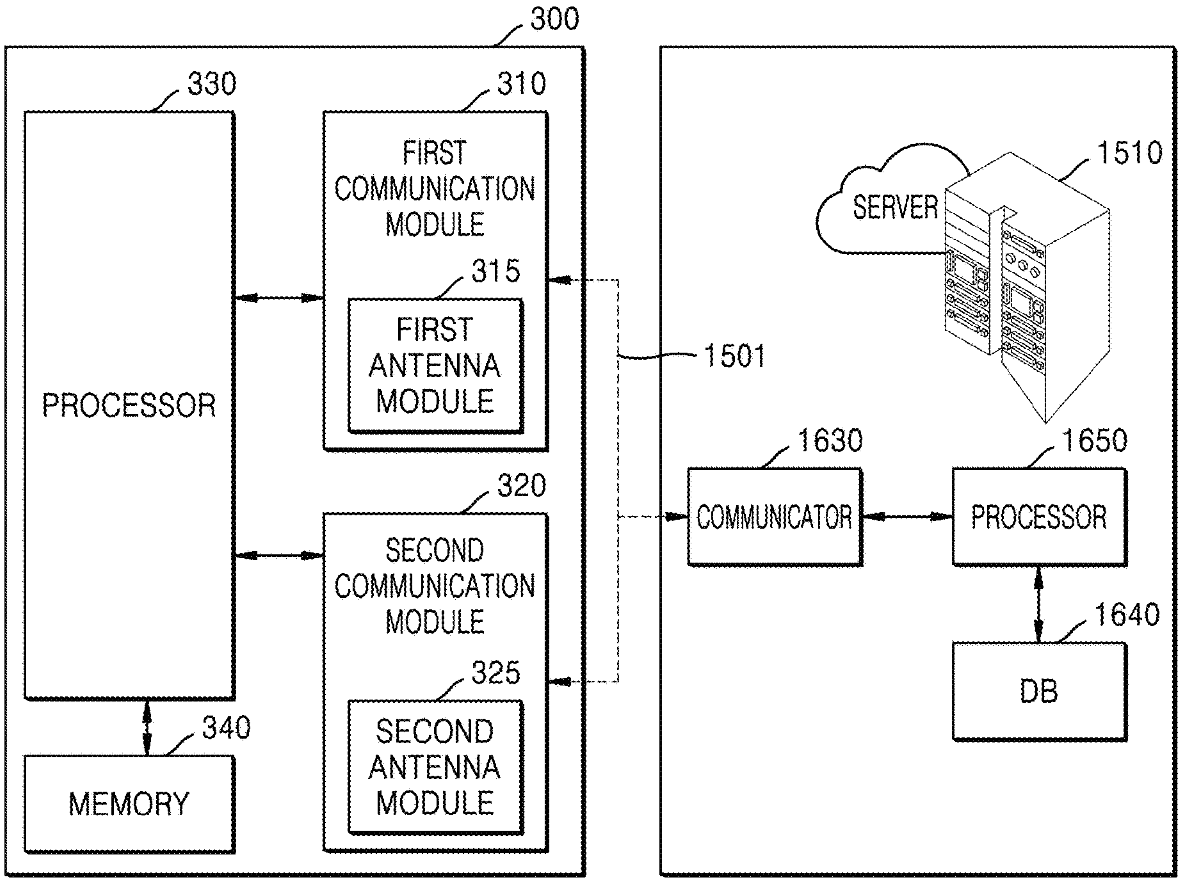
FIG. 16 is a diagram describing the operation of the electronic apparatus of FIG. 15 in detail.

FIG. 16 is a diagram describing FIG. 15 in detail. In FIG. 16, the same components as those in FIG. 15 are denoted by the same reference symbols. Thus, in describing the components of FIG. 16, redundant descriptions with the above descriptions will be omitted for conciseness.

Particularly, the vehicle electronic apparatus 300 may be the first terminal 10, the second terminal 20, or the third terminal 30 according to an embodiment of the disclosure. As an example, the vehicle electronic apparatus 300 of FIG. 16 will be described as being the same as the vehicle electronic apparatus 300 described above with reference to FIG. 3. Referring to FIG. 16, the server 1510 may include a communicator 1630 and a processor 1650. Also, the server 1510 may further include a database (DB) 1640.

The communicator 1630 may include one or more elements for allowing communication with the vehicle electronic apparatus 300. Also, the communicator 1630 may include at least one communication module such as a short-range communication module, a wired communication module, a mobile communication module, and/or a broadcast receiving module. Here, the at least one communication module may include a tuner performing broadcast reception and/or a communication module capable of performing data transmission/reception through a network conforming to a communication standard such as a communication method performing communication by using Bluetooth, Wireless LAN (WLAN) (WiFi), Wireless Broadband (WiBro), World Interoperability for Microwave Access (WiMAX), CDMA, WCDMA, Internet, 3G, 4G, 5G, and/or millimeter wave (mmWave).

For example, the communicator 1630 may rapidly transmit/receive a large amount of data by performing communication by using millimeter wave (mmWave). Particularly, the vehicle may increase the safety of the vehicle and/or the user's convenience by rapidly receiving a large amount of data and rapidly providing user content (e.g., movie or music) and/or data necessary for the safety of the vehicle (e.g., data necessary for autonomous driving and/or data necessary for a navigation service).

Particularly, the mobile communication module included in the communicator 1630 may communicate with another device (e.g., a server (not shown)) located at a long distance through a communication network conforming to a communication standard such as 3G, 4G, and/or 5G. Here, the communication module performing communication with another device located at a long distance may be referred to as a "long-range communication module".

The processor 1650 may control an overall operation of the server 1510. For example, the processor 1650 may perform desired operations by executing at least one of programs or at least one instruction of the server 1510.

Also, the DB 1640 may include a memory (not shown) and store at least one of at least one instruction, programs, or data necessary for the server 1510 to perform a certain operation in the memory (not shown). Also, the DB 1640 may store data necessary for the server 1510 to perform an operation according to the neural network.

Particularly, in an embodiment of the disclosure, the server 1510 may store the neural network 1410 described above with reference to FIG. 14. The neural network 1410 may be stored in at least one of the processor 1650 or the DB 1640. The neural network 1410 included in the server 1510 may be a neural network that has been trained.

Also, the server 1510 may transmit the trained neural network to the first communication module 310 or the second communication module 320 of the vehicle electronic apparatus 300 through the communicator 1630. Then, the vehicle electronic apparatus 300 may obtain and store the trained neural network and may obtain desired output data through the neural network.

A discussion for initial 5G mobile communication technology improvements and enhancements has been performed in consideration of services that 5G mobile communication technology was intended to support. These improvements and enhancements include, for example, a physical layer standardization for technologies such as vehicle-to-everything (V2X) to assist the driving determination of autonomous vehicles and increase the convenience of users based on the position and state information transmitted by the vehicles, new radio unlicensed (NR-U) standards to ensure that system operations can meet various regulation requirements in unlicensed bands, NR terminal low power consumption technology (UE power saving), a non-terrestrial network (NTN), also known as a terminal-satellite direct communication, for securing a coverage in an area where communication with a terrestrial network is impossible. Unfortunately, many of the improvements and enhancements offered by 5G mobile communication technologies are not natively compatible with current 4th generation (4G) communication systems. Thus, there is a need for a method capable of promoting the coexistence between long term evolution (LTE) V2X technology (that is, the 4th generation mobile communication technology) and NR V2X technology (that is, the 5th generation mobile communication technology).

The disclosure may provide an efficient radio resource allocation method for seamless coexistence between long term evolution (LTE) vehicle-to-everything (V2X) technology (4th generation mobile communication technology) and new radio (NR) V2X technology (5th generation mobile communication technology).

The disclosure may provide a terminal for disabling LTE V2X as necessary and an operating method of the terminal.

The terminal according to an embodiment of the disclosure may perform an operation for seamless coexistence between long term evolution (LTE) vehicle-to-everything (V2X) technology (4th generation mobile communication technology) and new radio (NR) V2X technology (5th generation mobile communication technology).

The power consumption of the terminal according to an embodiment of the disclosure may be reduced.

The efficiency of radio resources according to an embodiment of the disclosure may be increased.

In an embodiment, a vehicle electronic apparatus installed in a vehicle to perform vehicle-to-everything (V2X) communication may be provided.

In an embodiment, the vehicle electronic apparatus may include a first communication module configured to perform communication of a first communication type with at least one external device.

In an embodiment, the vehicle electronic apparatus may include a second communication module configured to perform communication of a second communication type.

In an embodiment, the vehicle electronic apparatus may include a memory storing one or more instructions.

In an embodiment, the vehicle electronic apparatus may include a processor configured to execute the one or more instructions stored in the memory.

In an embodiment, the processor is configured to control the first communication module to receive, from the at least one external device, a broadcast message indicating information about a communication type supported by the at least one external device.

In an embodiment, the processor is configured to disable the first communication module based on the broadcast message.

In an embodiment, the processor is configured to control the second communication module to perform communication with the at least one external device using the second communication type.

In an embodiment, the processor is configured to control the first communication module to receive a request message including information for requesting a communication type supported by the vehicle electronic apparatus.

In an embodiment, the processor is configured to control, based on the request message, the first communication module to transmit a response message including information related to the communication type supported by the vehicle electronic apparatus.

In an embodiment, the processor is configured to identify, based on the request message and the broadcast message, information about a communication type supported by the at least one external device within a coverage including the vehicle electronic apparatus, and In an embodiment, the processor is configured to identify, based on the information about the communication type supported by the at least one external device, whether to enable or disable the first communication module.

In an embodiment, the request message is transmitted together with a basic safety message (BSM), and wherein the request message is transmitted based on a preset period.

In an embodiment, the processor is configured to identify, based on the broadcast message and the request message including the information for requesting the communication type supported by the vehicle electronic apparatus, whether the information about the communication type supported by the at least one external device corresponds to the first communication type.

In an embodiment, the broadcast message corresponds to a response message of the at least one external device in response to the request message.

In an embodiment, the processor is configured to identify, based on the broadcast message, information about a communication type supported by the at least one external device.

In an embodiment, the processor is configured to identify, based on the information about the communication type supported by the at least one external device, whether to enable or disable the first communication module.

In an embodiment, the processor is configured to disable the first communication module in case that the information about the communication type supported by the at least one external device corresponds to the second communication type.

In an embodiment, the processor is configured to sense the broadcast message or a request message in a time interval allocated for the first communication type.

In an embodiment, the processor is configured to detect the broadcast message or the request message, based on a threshold value.

In an embodiment, the processor is configured to identify, in case that the broadcast message or the request message is detected, information for requesting a communication type or information about a communication type supported by the at least one external device.

In an embodiment, the processor is configured to identify, based on a result of the sensing of the broadcast message or the request message, the time interval allocated for the first communication type.

In an embodiment, the time interval allocated for the first communication type is statically or dynamically allocated to the vehicle electronic apparatus for reception of the broadcast message or the request message.

In an embodiment, the broadcast message is transmitted together with a basic safety message (BSM).

In an embodiment, a method, performed by a vehicle electronic apparatus, of performing vehicle-to-everything (V2X) communication is provided.

In an embodiment, the method comprises controlling a first communication module performing communication of a first communication type to receive, from at least one external device, a broadcast message indicating information about a communication type supported by the at least one external device.

In an embodiment, the method comprises disabling the first communication module based on the broadcast message.

In an embodiment, the method comprises controlling a second communication module to communicate with the at least one external device using the second communication type.

In an embodiment, the method comprises controlling the first communication module to receive a request message including information for requesting a communication type supported by the vehicle electronic apparatus.

In an embodiment, the method comprises controlling, based on the request message, the first communication module to transmit a response message including information related to the communication type supported by the vehicle electronic apparatus.

In an embodiment, wherein the disabling of the first communication module based on the broadcast message comprises: identifying, based on the request message and the broadcast message, information about a communication type supported by the at least one external device within a coverage including the vehicle electronic apparatus.

In an embodiment, wherein the disabling of the first communication module based on the broadcast message comprises: identifying, based on the information about the communication type supported by the at least one external device, whether to enable or disable the first communication module.

In an embodiment, wherein the disabling of the first communication module based on the broadcast message comprises identifying, based on the broadcast message and the request message including the information for requesting the communication type supported by the vehicle electronic apparatus, whether the information about the communication type supported by the at least one external device corresponds to the first communication type.

In an embodiment, wherein the disabling of the first communication module based on the broadcast message comprises: identifying, based on the broadcast message, information about a communication type supported by the at least one external device.

In an embodiment, wherein the disabling of the first communication module based on the broadcast message comprises: identifying, based on the information about the communication type supported by the at least one external device, whether to enable or disable the first communication module.

In an embodiment, wherein the disabling of the first communication module based on the broadcast message comprises disabling the first communication module in case that the information about the communication type supported by the at least one external device corresponds to the second communication type.

In an embodiment, the method comprising: sensing the broadcast message or a request message in a time interval allocated for the first communication type.

In an embodiment, the method comprising: detecting the broadcast message or the request message based on a threshold value.

In an embodiment, the method comprising: identifying, in case that the broadcast message or the request message is detected, information for requesting a communication type or information about a communication type supported by the at least one external device.

In an embodiment, wherein the time interval allocated for the first communication type is statically or dynamically allocated to the vehicle electronic apparatus for reception of the broadcast message or the request message.

A discussion for initial 5G mobile communication technology improvements and enhancements has been performed in consideration of services that 5G mobile communication technology was intended to support. These improvements and enhancements include, for example, a physical layer standardization for technologies such as vehicle-to-everything (V2X) to assist the driving determination of autonomous vehicles and increase the convenience of users based on the position and state information transmitted by the vehicles, new radio unlicensed (NR-U) standards to ensure that system operations can meet various regulation requirements in unlicensed bands, NR terminal low power consumption technology (UE power saving), a non-terrestrial network (NTN), also known as a terminal-satellite direct communication, for securing a coverage in an area where communication with a terrestrial network is impossible. Unfortunately, many of the improvements and enhancements offered by 5G mobile communication technologies are not natively compatible with current 4th generation (4G) communication systems. Thus, there is a need for a method capable of promoting the coexistence between long term evolution (LTE) V2X technology (that is, the 4th generation mobile communication technology) and NR V2X technology (that is, the 5th generation mobile communication technology).

The disclosure may provide an efficient radio resource allocation method for seamless coexistence between long term evolution (LTE) vehicle-to-everything (V2X) technology (4th generation mobile communication technology) and new radio (NR) V2X technology (5th generation mobile communication technology).

The disclosure may provide a terminal for disabling LTE V2X as necessary and an operating method of the terminal.

The terminal according to an embodiment of the disclosure may perform an operation for seamless coexistence between long term evolution (LTE) vehicle-to-everything (V2X) technology (4th generation mobile communication technology) and new radio (NR) V2X technology (5th generation mobile communication technology).

The power consumption of the terminal according to an embodiment of the disclosure may be reduced.

The efficiency of radio resources according to an embodiment of the disclosure may be increased.

In an embodiment, a vehicle electronic apparatus installed in a vehicle to perform vehicle-to-everything (V2X) communication may be provided.

In an embodiment, the vehicle electronic apparatus may include a first communication module configured to perform communication of a first communication type with at least one external device.

In an embodiment, the vehicle electronic apparatus may include a second communication module configured to perform communication of a second communication type.

In an embodiment, the vehicle electronic apparatus may include a memory storing one or more instructions.

In an embodiment, the vehicle electronic apparatus may include a processor configured to execute the one or more instructions stored in the memory.

In an embodiment, the processor is configured to control the first communication module to receive, from the at least one external device, a broadcast message indicating information about a communication type supported by the at least one external device.

In an embodiment, the processor is configured to disable the first communication module based on the broadcast message.

In an embodiment, the processor is configured to control the second communication module to perform communication with the at least one external device using the second communication type.

In an embodiment, the processor is configured to control the first communication module to receive a request message including information for requesting a communication type supported by the vehicle electronic apparatus.

In an embodiment, the processor is configured to control, based on the request message, the first communication module to transmit a response message including information related to the communication type supported by the vehicle electronic apparatus.

In an embodiment, the processor is configured to identify, based on the request message and the broadcast message, information about a communication type supported by the at least one external device within a coverage including the vehicle electronic apparatus, and In an embodiment, the processor is configured to identify, based on the information about the communication type supported by the at least one external device, whether to enable or disable the first communication module.

In an embodiment, the request message is transmitted together with a basic safety message (BSM), and wherein the request message is transmitted based on a preset period.

In an embodiment, the processor is configured to identify, based on the broadcast message and the request message including the information for requesting the communication type supported by the vehicle electronic apparatus, whether the information about the communication type supported by the at least one external device corresponds to the first communication type.

In an embodiment, the broadcast message corresponds to a response message of the at least one external device in response to the request message.

In an embodiment, the processor is configured to identify, based on the broadcast message, information about a communication type supported by the at least one external device.

In an embodiment, the processor is configured to identify, based on the information about the communication type supported by the at least one external device, whether to enable or disable the first communication module.

In an embodiment, the processor is configured to disable the first communication module in case that the information about the communication type supported by the at least one external device corresponds to the second communication type.

In an embodiment, the processor is configured to sense the broadcast message or a request message in a time interval allocated for the first communication type.

In an embodiment, the processor is configured to detect the broadcast message or the request message, based on a threshold value.

In an embodiment, the processor is configured to identify, in case that the broadcast message or the request message is detected, information for requesting a communication type or information about a communication type supported by the at least one external device.

In an embodiment, the processor is configured to identify, based on a result of the sensing of the broadcast message or the request message, the time interval allocated for the first communication type.

In an embodiment, the time interval allocated for the first communication type is statically or dynamically allocated to the vehicle electronic apparatus for reception of the broadcast message or the request message.

In an embodiment, the broadcast message is transmitted together with a basic safety message (BSM).

In an embodiment, a method, performed by a vehicle electronic apparatus, of performing vehicle-to-everything (V2X) communication is provided.

In an embodiment, the method comprises controlling a first communication module performing communication of a first communication type to receive, from at least one external device, a broadcast message indicating information about a communication type supported by the at least one external device.

In an embodiment, the method comprises disabling the first communication module based on the broadcast message.

In an embodiment, the method comprises controlling a second communication module to communicate with the at least one external device using the second communication type.

In an embodiment, the method comprises controlling the first communication module to receive a request message including information for requesting a communication type supported by the vehicle electronic apparatus.

In an embodiment, the method comprises controlling, based on the request message, the first communication module to transmit a response message including information related to the communication type supported by the vehicle electronic apparatus.

In an embodiment, wherein the disabling of the first communication module based on the broadcast message comprises: identifying, based on the request message and the broadcast message, information about a communication type supported by the at least one external device within a coverage including the vehicle electronic apparatus.

In an embodiment, wherein the disabling of the first communication module based on the broadcast message comprises: identifying, based on the information about the communication type supported by the at least one external device, whether to enable or disable the first communication module.

In an embodiment, wherein the disabling of the first communication module based on the broadcast message comprises identifying, based on the broadcast message and the request message including the information for requesting the communication type supported by the vehicle electronic apparatus, whether the information about the communication type supported by the at least one external device corresponds to the first communication type.

In an embodiment, wherein the disabling of the first communication module based on the broadcast message comprises: identifying, based on the broadcast message, information about a communication type supported by the at least one external device.

In an embodiment, wherein the disabling of the first communication module based on the broadcast message comprises: identifying, based on the information about the communication type supported by the at least one external device, whether to enable or disable the first communication module.

In an embodiment, wherein the disabling of the first communication module based on the broadcast message comprises disabling the first communication module in case that the information about the communication type supported by the at least one external device corresponds to the second communication type.

In an embodiment, the method comprising: sensing the broadcast message or a request message in a time interval allocated for the first communication type.

In an embodiment, the method comprising: detecting the broadcast message or the request message based on a threshold value.

In an embodiment, the method comprising: identifying, in case that the broadcast message or the request message is detected, information for requesting a communication type or information about a communication type supported by the at least one external device.

In an embodiment, wherein the time interval allocated for the first communication type is statically or dynamically allocated to the vehicle electronic apparatus for reception of the broadcast message or the request message.

The machine-readable storage medium may be provided in the form of a non-transitory storage medium. Here, the term "non-transitory storage medium" may mean that the storage medium is a tangible device and does not include signals (e.g., electromagnetic waves), and may mean that data may be semipermanently or temporarily stored in the storage medium. For example, the "non-transitory storage medium" may include a buffer in which data is temporarily stored.

According to an embodiment of the disclosure, the method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)) or may be distributed (e.g., downloaded or uploaded) online through an application store or directly between two user devices (e.g., smartphones). In the case of online distribution, at least a portion of the computer program product (e.g., a downloadable app) may be at least temporarily stored or temporarily generated in a machine-readable storage medium such as a memory of a manufacturer server, a memory of an application store server, or a memory of a relay server.

The above embodiments may be implemented independently or may be implemented in combination. Although embodiments of the disclosure have been described above in detail, the scope of the disclosure is not limited thereto and various modifications and improvements made by those of ordinary skill in the art by using the basic concept of the disclosure defined in the following claims are also included in the scope of the disclosure.

The invention claimed is:

1. A vehicle electronic apparatus installed in a vehicle to perform vehicle-to-everything (V2X) communication, the vehicle electronic apparatus comprising:

a first communication module configured to perform V2X communication using long term evolution (LTE) V2X technology with at least one external device;

a second communication module configured to perform V2X communication using new radio (NR) V2X technology;

a memory storing one or more instructions; and a processor configured to execute the one or more instructions stored in the memory, the processor further configured to:

control the first communication module to receive, from a plurality of external devices within a coverage of the vehicle electronic apparatus, broadcast messages indicating information about communication types supported by each of the plurality of external devices, identify, based on the broadcast messages, communication types supported by each of the plurality of external devices within the coverage of the vehicle electronic apparatus, in response to determining, based on the identified communication types, that none of the plurality of external devices supports only the LTE V2X technology without supporting the NR V2X technology, disable the first communication module, maintain the first communication module in a disabled state, and maintain the second communication module in an enabled state, and control the second communication module to perform V2X communication with at least one of the plurality of external devices using the NR V2X technology, and in response to determining, based on the identified communication types, that at least one of the plurality of external devices supports only the LTE V2X technology without supporting the NR V2X technology, maintain the first communication module in an enabled state, and control the first communication module to perform V2X communication with at least one of the plurality of external devices using the LTE V2X technology.

2. The vehicle electronic apparatus of claim 1, wherein the processor is further configured to:

control the first communication module to receive a request message including information for requesting a communication type supported by the vehicle electronic apparatus, and control, based on the request message, the first communication module to transmit a response message including information related to the communication type supported by the vehicle electronic apparatus.

3. The vehicle electronic apparatus of claim 2, wherein the request message is transmitted together with a basic safety message (BSM), and wherein the request message is transmitted based on a preset period.

4. The vehicle electronic apparatus of claim 2, wherein the broadcast message corresponds to a response message of the at least one external device in response to the request message.

5. The vehicle electronic apparatus of claim 1, wherein the processor is further configured to:

sense the broadcast message or a request message in a time interval allocated for the LTE V2X technology, detect the broadcast message or the request message, based on a threshold value, and identify, in case that the broadcast message or the request message is detected, information for requesting a communication type or information about a communication type supported by the at least one external device.

6. The vehicle electronic apparatus of claim 5, wherein the processor is further configured to identify, based on a result of the sensing of the broadcast message or the request message, the time interval allocated for the LTE V2X technology.

7. The vehicle electronic apparatus of claim 5, wherein the time interval allocated for the LTE V2X technology is statically or dynamically allocated to the vehicle electronic apparatus for reception of the broadcast message or the request message.

8. The vehicle electronic apparatus of claim 1, wherein the broadcast message is transmitted together with a basic safety message (BSM).

9. A method, performed by a vehicle electronic apparatus of performing vehicle-to-everything (V2X) communication, the method comprising:

controlling a first communication module performing V2X communication using long term evolution (LTE) V2X technology to receive, from a plurality of external devices within a coverage of the vehicle electronic apparatus, a broadcast messages indicating information about communication types supported by each of the plurality of external devices;

identifying, based on the broadcast messages, communication types supported by each of the plurality of external devices within the coverage of the vehicle electronic apparatus;

in response to determining, based on the identified communication types, that none of the plurality of external devices supports only the LTE V2X technology without supporting the NR V2X technology, disabling the first communication module, maintaining the first communication module in a disabled state, and maintaining a second communication module in an enabled state; and controlling the second communication module to perform V2X communication with at least one of the plurality of external devices using the NR V2X technology; and in response to determining, based on the identified communication types, that at least one of the plurality of external devices supports only the LTE V2X technology without supporting the NR V2X technology, maintaining the first communication module in an enabled state, and controlling the first communication module to perform V2X communication with at least one of the plurality of external devices using the LTE V2X technology.

10. The method of claim 9, further comprising:

controlling the first communication module to receive a request message including information for requesting a communication type supported by the vehicle electronic apparatus; and controlling, based on the request message, the first communication module to transmit a response message including information related to the communication type supported by the vehicle electronic apparatus.

11. The method of claim 9, further comprising:

sensing the broadcast message or a request message in a time interval allocated for the LTE V2X technology;

detecting the broadcast message or the request message based on a threshold value; and identifying, in case that the broadcast message or the request message is detected, information for requesting a communication type or information about a communication type supported by the at least one external device.

12. The method of claim 11, wherein the time interval allocated for the LTE V2X technology is statically or dynamically allocated to the vehicle electronic apparatus for reception of the broadcast message or the request message.

* * * * *